US012762609B2

(12) United States Patent
Kurioka et al.

(10) Patent No.: US 12,762,609 B2
(45) Date of Patent: Oct. 13, 2026

(54) INFORMATION PROCESSING APPARATUS, COMMODITY ORDER SYSTEM, CONTROL METHOD FOR INFORMATION PROCESSING APPARATUS, AND NON-TRANSITORY TANGIBLE STORAGE MEDIUM

(71) Applicant: Glory Ltd., Himeji (JP)

(72) Inventors: Katsuhito Kurioka, Himeji (JP); Keishi Kobayashi, Himeji (JP)

(73) Assignee: GLORY LTD., Himeji (JP)

( * ) Notice: Subject to any disclaimer, the term of this patent is extended or adjusted under 35 U.S.C. 154(b) by 167 days.

(21) Appl. No.: 18/916,735

(22) Filed: Oct. 16, 2024

(65) Prior Publication Data

US 2025/0124493 A1 Apr. 17, 2025

(30) Foreign Application Priority Data

Oct. 17, 2023 (JP) ................................ 2023-178844

(51) Int. Cl.
*G06Q 30/00* (2023.01)
*G06Q 30/0601* (2023.01)
*G06T 7/70* (2017.01)

(52) U.S. Cl.
CPC ........... *G06Q 30/0641* (2013.01); *G06T 7/70* (2017.01); *G06T 2207/30201* (2013.01)

(58) Field of Classification Search
None
See application file for complete search history.

(56) References Cited

U.S. PATENT DOCUMENTS 11,887,173 B2* 1/2024 Haapoja ............. G06Q 30/0255
2017/0269683 A1* 9/2017 Segawa ............. G06Q 30/0272
2018/0181809 A1* 6/2018 Ranjan ................. G06N 3/0464
2021/0078408 A1* 3/2021 Cordell .................. B60K 35/85
2022/0191638 A1* 6/2022 Stengel ................... H04S 7/304
2025/0086823 A1* 3/2025 Mathew .................... G06T 7/50

FOREIGN PATENT DOCUMENTS

JP 2012-022589 A 2/2012
WO WO 2018203512 * 10/2017 ............ G06Q 30/06

OTHER PUBLICATIONS

"Assisting system for grocery shopping navigation and product recommendation"; Villegas et al.; 2017 IEEE 6th Global Conference on Consumer Electronics (GCCE) (2017, pp. 1-4); Oct. 1, 2017.*

* cited by examiner

*Primary Examiner* — Mila Airapetian
(74) *Attorney, Agent, or Firm* — XSENSUS LLP

(57) ABSTRACT

A controller of an information processing apparatus executes a first process for specifying a menu medium in which a customer has shown interest, from a captured image of the customer in a movement path; and a second process for causing a display to display, at least at an arrival timing when the customer has arrived at a facing position, a display screen such that a commodity related to the menu medium specified by the first process with respect to the customer is prioritized as a selection candidate.

14 Claims, 17 Drawing Sheets

EMBODIMENT 1

FIG. 6
GAZE STATUS ASSOCIATION INFORMATION
| SERIAL NUMBER | FACE INFORMATION | DETECTION ITEM | MENU MEDIUM A' | MENU MEDIUM B' | MENU MEDIUM C' | ... | MENU MEDIUM P' |
|---|---|---|---|---|---|---|---|
| ... | 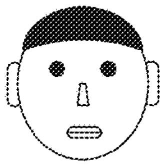 | NUMBER OF TIMES | 3 | 0 | 2 | ... | 1 |
| | | TIME | 40 | 0 | 10 | ... | 8 |
| ... | 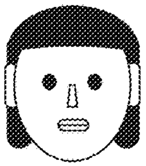 | NUMBER OF TIMES | 2 | 3 | 1 | ... | 0 |
| | | TIME | 15 | 50 | 5 | ... | 0 |
| ⋮ | ⋮ | ⋮ | ⋮ | ⋮ | ⋮ | ⋮ | ⋮ |

*FIG. 7A*

COMMODITY ASSOCIATION INFORMATION

| | |
|---|---|
| MENU MEDIUM A' | COMMODITY A |
| MENU MEDIUM B' | COMMODITY B |
| MENU MEDIUM C' | COMMODITY C |
| ⋮ | ⋮ |
| MENU MEDIUM P' | COMMODITY P |

*FIG. 7B*

CLASSIFICATION ASSOCIATION INFORMATION

| | FIRST CLASSIFICATION | SECOND CLASSIFICATION | THIRD CLASSIFICATION |
|---|---|---|---|
| COMMODITY A | CLASSIFICATION 1A | CLASSIFICATION 2A | CLASSIFICATION 3A |
| COMMODITY B | CLASSIFICATION 1A | CLASSIFICATION 2A | CLASSIFICATION 3A |
| COMMODITY C | CLASSIFICATION 1A | CLASSIFICATION 2A | CLASSIFICATION 3A |
| ⋮ | ⋮ | ⋮ | ⋮ |
| COMMODITY Q | CLASSIFICATION 1B | CLASSIFICATION 2B | CLASSIFICATION 3F |

| ⇧ | ⇧ | ⇧ |
|---|---|---|
| MAIN DISH/ SIDE DISH | FOOD/BEVERAGE | NOODLES/RICE · RICE BOWL DISH/ ⋮ |

*FIG. 15*

RELATIONSHIP INFORMATION

| | ATTRIBUTE | | | COMMODITY | | MATCH/MISMATCH | SIMILARITY | | |
|---|---|---|---|---|---|---|---|---|---|
| SERIAL NUMBER | AGE | SEX | ... | SPECIFIED COMMODITY | PURCHASED COMMODITY | | FIRST CLASSIFICATION | SECOND CLASSIFICATION | THIRD CLASSIFICATION |
| ... | 30 | MALE | ... | COMMODITY A | COMMODITY A | ○ | ○ | ○ | ○ |
| ... | 25 | FEMALE | ... | COMMODITY B | COMMODITY C | × | ○ | ○ | ○ |
| ... | 40 | MALE | ... | COMMODITY A | COMMODITY G | × | ○ | ○ | × |
| ⋮ | ⋮ | ⋮ | ⋮ | ⋮ | ⋮ | ⋮ | ⋮ | ⋮ | ⋮ |

EMBODIMENT 2

EMBODIMENT 3

INFORMATION PROCESSING APPARATUS, COMMODITY ORDER SYSTEM, CONTROL METHOD FOR INFORMATION PROCESSING APPARATUS, AND NON-TRANSITORY TANGIBLE STORAGE MEDIUM

CROSS-REFERENCE TO RELATED APPLICATION

This application claims priority under 35 U.S.C. Section 119 of Japanese Patent Application No. 2023-178844 filed Oct. 17, 2023, entitled "INFORMATION PROCESSING APPARATUS, COMMODITY ORDER SYSTEM, CONTROL METHOD FOR INFORMATION PROCESSING APPARATUS, AND PROGRAM". The disclosure of the above application is incorporated herein by reference.

BACKGROUND OF THE INVENTION

Field of the Invention

The present invention relates to an information processing apparatus for performing a process related to an order of a commodity, a commodity order system, a control method for the information processing apparatus, and a non-transitory tangible storage medium storing a program that causes the information processing apparatus to execute a predetermined function.

Description of Related Art

At present, a commodity order apparatus that is used for ordering a commodity is installed in a store. For example, as an apparatus of this kind, a ticket vending machine is installed in a store. A customer operates the ticket vending machine to select a commodity that the customer desires, and performs a payment process. Accordingly, an exchange ticket for the commodity is issued from the ticket vending machine. The apparatus of this kind is desired to allow the customer to smoothly select a commodity.

Japanese Laid-Open Patent Publication No. 2012-022589 describes a commodity selection support method in which the line of sight of a customer is detected to support selection of a commodity. In this method, a screen in which a plurality of images of commodities in a random arrangement are scrolled is displayed on a display. When the customer approaches this screen and gazes at an image of a specific commodity, an image of commodities in a gazed region including the gazed point is displayed in a region at the center of the screen. Then, when the customer continues to gaze at an image of a commodity in this region, the image of this commodity is highlighted. Accordingly, the customer can smoothly perform selection of the commodity.

However, in the above commodity selection support method, after the customer has faced the display, the commodity in which the customer is interested is determined from the line of sight of the customer, and then, the display screen is switched. Therefore, it takes time from when the customer has faced the display until the commodity of the gazing target is displayed, and during this time, the customer has to wait to select the commodity.

SUMMARY OF THE INVENTION

A first aspect of the present invention relates to an information processing apparatus to be used in a store. In the store, a plurality of kinds of menu media are disposed so as to be able to be viewed by a customer in a movement path of the customer up to a facing position where the customer faces a display configured to display a selection candidate for a commodity. The information processing apparatus includes a controller. The controller executes: a first process for specifying the menu medium in which the customer has shown interest, from a captured image of the customer in the movement path; and a second process for causing the display to display, at least at an arrival timing when the customer has arrived at the facing position, a display screen such that a commodity related to the menu medium specified by the first process with respect to the customer is prioritized as the selection candidate.

In the information processing apparatus according to the present aspect, a commodity related to the menu medium in which the customer has shown interest in the movement path is displayed on the display screen in a prioritized manner as a selection candidate at least at the timing when the customer has arrived at the facing position. Therefore, the commodity in which the customer has shown interest can be smoothly and quickly displayed as a selection candidate. Accordingly, convenience in commodity selection for the customer can be enhanced.

A second aspect of the present invention relates to a commodity order system configured to receive an order of a commodity by using a commodity order apparatus configured to display a selection candidate for a commodity. The commodity order system is used in a store, and in the store, a plurality of kinds of menu media are disposed so as to be able to be viewed by a customer in a movement path of the customer up to a facing position where the customer faces the commodity order apparatus. The commodity order system includes a controller. The controller executes: a first process for specifying the menu medium in which the customer has shown interest, from a captured image of the customer in the movement path; and a second process for causing a display of the commodity order apparatus to display, at least at an arrival timing when the customer has arrived at the facing position, a display screen such that a commodity related to the menu medium specified by the first process with respect to the customer is prioritized as the selection candidate.

A third aspect of the present invention relates to a control method for an information processing apparatus to be used in a store. In the store, a plurality of kinds of menu media are disposed so as to be able to be viewed by a customer in a movement path of the customer up to a facing position where the customer faces a display configured to display a selection candidate for a commodity. The control method according to this aspect includes: specifying the menu medium in which the customer has shown interest, from a captured image of the customer in the movement path; and executing a process for causing the display to display, at least at an arrival timing when the customer has arrived at the facing position, a display screen such that a commodity related to the menu medium specified with respect to the customer is prioritized as the selection candidate.

A fourth aspect of the present invention relates to a non-transitory tangible storage medium storing a program for causing an information processing apparatus to be used in a store to execute a predetermined function. In the store, a plurality of kinds of menu media are disposed so as to be able to be viewed by a customer in a movement path of the customer up to a facing position where the customer faces a display configured to display a selection candidate for a commodity. The program according to this aspect causes the information processing apparatus to execute: a function for specifying the menu medium in which the customer has shown interest, from a captured image of the customer in the movement path; and a function for causing the display to display, at least at an arrival timing when the customer has arrived at the facing position, a display screen such that a commodity related to the menu medium specified with respect to the customer is prioritized as the selection candidate.

The effects and the significance of the present invention will be further clarified by the description of the embodiments below. However, the embodiments below are merely examples for implementing the present invention. The present invention is not limited to the description of the embodiments below in any way.

BRIEF DESCRIPTION OF THE DRAWINGS

FIG. 6 shows a configuration of gaze status association information according to Embodiment 1;

FIG. 7A and FIG. 7B respectively show commodity association information and classification association information stored in a memory of the ticket vending machine according to Embodiment 1;

FIG. 15 shows a configuration of purchase management information for managing the commodity purchase status of the customer in the store according to Embodiment 1;

DETAILED DESCRIPTION

Hereinafter, embodiments of the present invention will be described with reference to the drawings.

Embodiment 1

Figure 1:
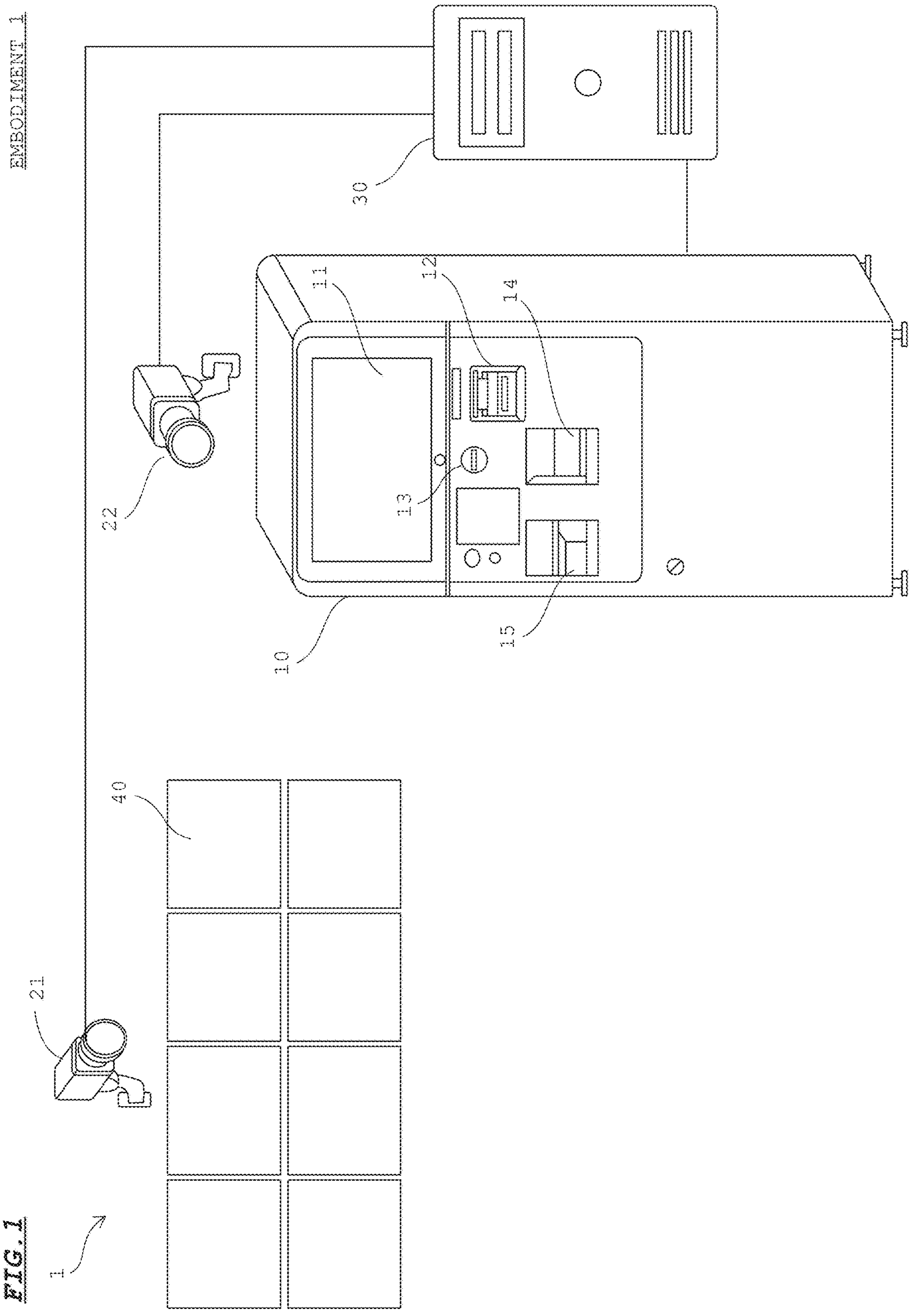
FIG. 1 shows a configuration of a commodity order system according to Embodiment 1.

FIG. 1 shows a configuration of a commodity order system 1 according to Embodiment 1.

The commodity order system 1 includes a ticket vending machine 10, cameras 21, 22, and an information processing apparatus 30. The commodity order system 1 is used in a store such as a restaurant.

The ticket vending machine 10 is installed in the store. A customer having visited the store purchases a ticket for a commodity that the customer desires, from the ticket vending machine 10. The ticket vending machine 10 is a commodity order apparatus that displays a selection candidate for a commodity. In the store, in a movement path of the customer up to a facing position where the customer faces the ticket vending machine 10, a plurality of kinds of menu media 40 are disposed so as to be able to be viewed by the customer. Here, a plurality of menu media 40 are disposed in the store.

In the respective menu media 40, figures of commodities different from each other and brief information (price, catch phrase, etc.) regarding the commodities are displayed. Each menu medium 40 is a poster, for example. The menu medium 40 may be another medium such as a digital signage or a large screen.

The camera 21 captures an image of the customer who moves toward the ticket vending machine 10 in the store. The camera 21 is used in order to determine whether or not the customer has viewed the menu media 40. The camera 21 is disposed so as to be able to capture an image of the face of the customer viewing the menu media 40. Preferably, the camera 21 is disposed in the surrounding of the arrangement region of the menu media 40, such as at a position immediately above the arrangement region.

The camera 22 captures an image of a predetermined region to the front of the ticket vending machine 10, from behind the ticket vending machine 10. A captured image from the camera 22 is used in collation between the customer having viewed the menu media 40 in the movement path and the customer having reached the facing position. When this collation can be performed only by the camera 21 according to the relationship between the arrangement position of the menu media 40 and the imaging field of view of the camera 21, the camera 22 may be omitted.

The information processing apparatus 30 is communicably connected to the ticket vending machine 10 and the camera 21. The information processing apparatus 30 is installed in an office room or the like of the store where the ticket vending machine 10 is installed. The information processing apparatus 30 may be installed in a facility other than the store. In this case, the information processing apparatus 30 performs communication with the ticket vending machine 10 and the camera 21 via a public telecommunication network such as the Internet.

The information processing apparatus 30 performs a process for adjusting a screen (commodity selection screen)

that is displayed on the ticket vending machine 10, based on a captured image from the camera 21. The information processing apparatus 30 is implemented by a server computer or a personal computer, for example. When a plurality of sets of the ticket vending machine 10 and the camera 22 are installed in the store, the information processing apparatus 30 may be communicably connected to the ticket vending machine 10 of each set. In this case, the information processing apparatus 30 performs the above-described process for each set of the ticket vending machine 10 and the camera 22.

The ticket vending machine 10 is communicably connected to the camera 22. The ticket vending machine 10 has a housing having an approximately cube shape forming the outer shape of the apparatus. In an upper portion of the front face of the ticket vending machine 10, an operation/display unit 11 of a touch panel-type is disposed. As described later with reference to FIG. 3, the operation/display unit 11 has a configuration in which a transparent touch sensor 107 is disposed on the upper face of a display 106. The display 106 is a liquid crystal display, for example, and the touch sensor 107 is a touch pad of a pressure-sensitive type (resistive film type), for example. However, the configuration of the operation/display unit 11 is not limited thereto, and the touch sensor 107 may be a touch pad of a capacitance type, for example.

In a center portion of the front face of the ticket vending machine 10, a banknote inlet/outlet 12 through which banknotes are deposited and dispensed, a coin inlet 13 through which coins are deposited, a coin outlet 14 through which coins are dispensed, and a ticket issuing port 15 through which a ticket is issued are disposed. Furthermore, a human detection sensor is disposed in the ticket vending machine 10. The human detection sensor detects that the customer has reached the vicinity of the facing position where the customer faces the operation/display unit 11 of the ticket vending machine 10.

Here, the facing position is the position where the customer faces the operation/display unit 11 (a display configured to display a selection candidate for a commodity) in order to perform an order for a commodity. That is, the facing position is the position for performing selection of a commodity by using a display screen.

In Embodiment 1, the position where the customer faces the operation/display unit 11 for causing ticket issuing for a commodity corresponds to the facing position. In other words, the position where the customer operates (the position where the customer can operate) the operation/display unit 11 is the facing position. The facing position need not necessarily be directly in front of the operation/display unit 11, and may be slightly shifted to the left or right from the position directly in front of the operation/display unit 11. With respect to the ticket vending machine 10, the facing position is defined as a position separated to the front by a predetermined distance (e.g., several tens of cm) from the operation/display unit 11.

The farthest position of the detection range of the human detection sensor is set to be equal to or larger than the distance up to this facing position, at least. The farthest position of the detection range may be set to be a position that is still farther by a predetermined distance (e.g., several tens of cm) from the distance up to the facing position. The vicinity of the facing position described above is the range between this farthest position and the facing position.

The fact that the customer has reached the vicinity of the facing position may be determined by using the captured image from the camera 22. In this case, for example, the ticket vending machine 10 extracts a face region from the captured image from the camera 22, and when the size (e.g., area, vertical width, etc.) of the extracted face region becomes equal to or larger than a predetermined threshold, the ticket vending machine 10 determines that the customer has reached the vicinity of the facing position. In this configuration, the human detection sensor can be omitted from the ticket vending machine 10.

When the fact that the customer has reached the vicinity of the facing position has been detected by the human detection sensor, a commodity selection screen is displayed on the operation/display unit 11. Here, selection items for foods and beverages that the store can provide is displayed. The customer touches a desired selection item among a plurality of selection items displayed on the operation/display unit 11, thereby performing selection of a commodity to be purchased.

Then, the customer puts banknotes or coins corresponding to the amount of money necessary for purchase of the commodity, into the banknote inlet/outlet 12 or the coin inlet 13. Accordingly, a ticket corresponding to the selection item is issued from the ticket issuing port 15. When there is change, banknotes or coins corresponding to the change are dispensed from the banknote inlet/outlet 12 or the coin outlet 14. Then, one transaction process ends.

Figure 2:
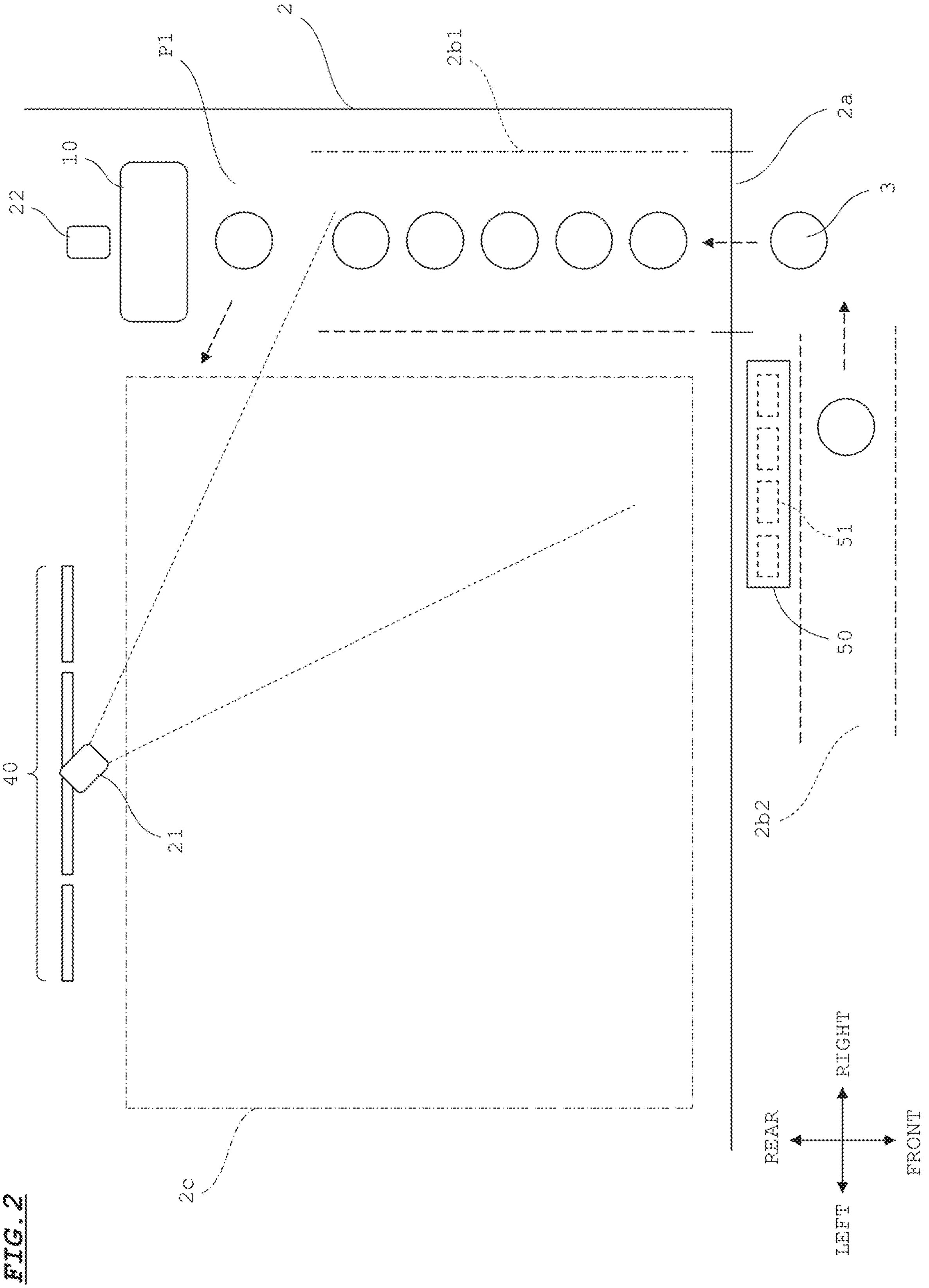
FIG. 2 is a plan view schematically showing an arrangement example of a ticket vending machine, cameras, and menu media in a store according to Embodiment 1.

FIG. 2 is a plan view schematically showing an arrangement example of the ticket vending machine 10, the cameras 21, 22, and the menu media 40 in a store 2.

The ticket vending machine 10 is installed on the depth side in the direction in which a customer 3 moves straight from an entrance 2*a* of the store 2. The ticket vending machine 10 is installed such that the front thereof is oriented in the direction of the entrance 2*a*. The range from the entrance 2*a* up to before the ticket vending machine 10 serves as a movement path 2*b*1 in which the customer 3 moves toward the ticket vending machine 10. The left side of the movement path 2*b*1 is an eating and drinking space 2*c*. In the eating and drinking space 2*c*, a plurality of tables and a plurality of chairs are disposed. The movement path 2*b*1 is defined between the eating and drinking space 2*c* and the inner wall of the store 2. The customer 3 moves straight along the movement path 2*b*1 and reaches a facing position P1. After ticket issuing has been performed, the customer 3 advances from the facing position P1 to the eating and drinking space 2*c*.

On the depth side of the eating and drinking space 2*c*, the plurality of menu media 40 are arranged. The plurality of menu media 40 are able to be viewed by the customer 3 in the movement path 2*b*1. The camera 21 captures an image of the vicinity of the movement path 2*b*1 in a diagonal direction from a position immediately above the region where the plurality of menu media 40 are disposed. The range between the broken lines extending from the camera 21 is the imaging field of view of the camera 21. The boundary on the ticket vending machine 10 side of the imaging field of view of the camera 21 is on the entrance 2*a* side at a predetermined distance from the facing position P1. The other camera 22 is disposed approximately at the center on the depth side of the ticket vending machine 10, and captures an image of the vicinity of the facing position P1.

In the example in FIG. 2, a showcase 50 is installed to the left of the entrance 2*a*, outside the store 2. In this showcase 50, a plurality of menu media 51 are displayed. Each menu medium 51 is a model commodity sample. The space on the front side of this showcase 50 also serves as a movement path 2*b*2 in which the customer 3 moves toward the ticket vending machine 10 via the entrance 2*a*.

Figure 3:
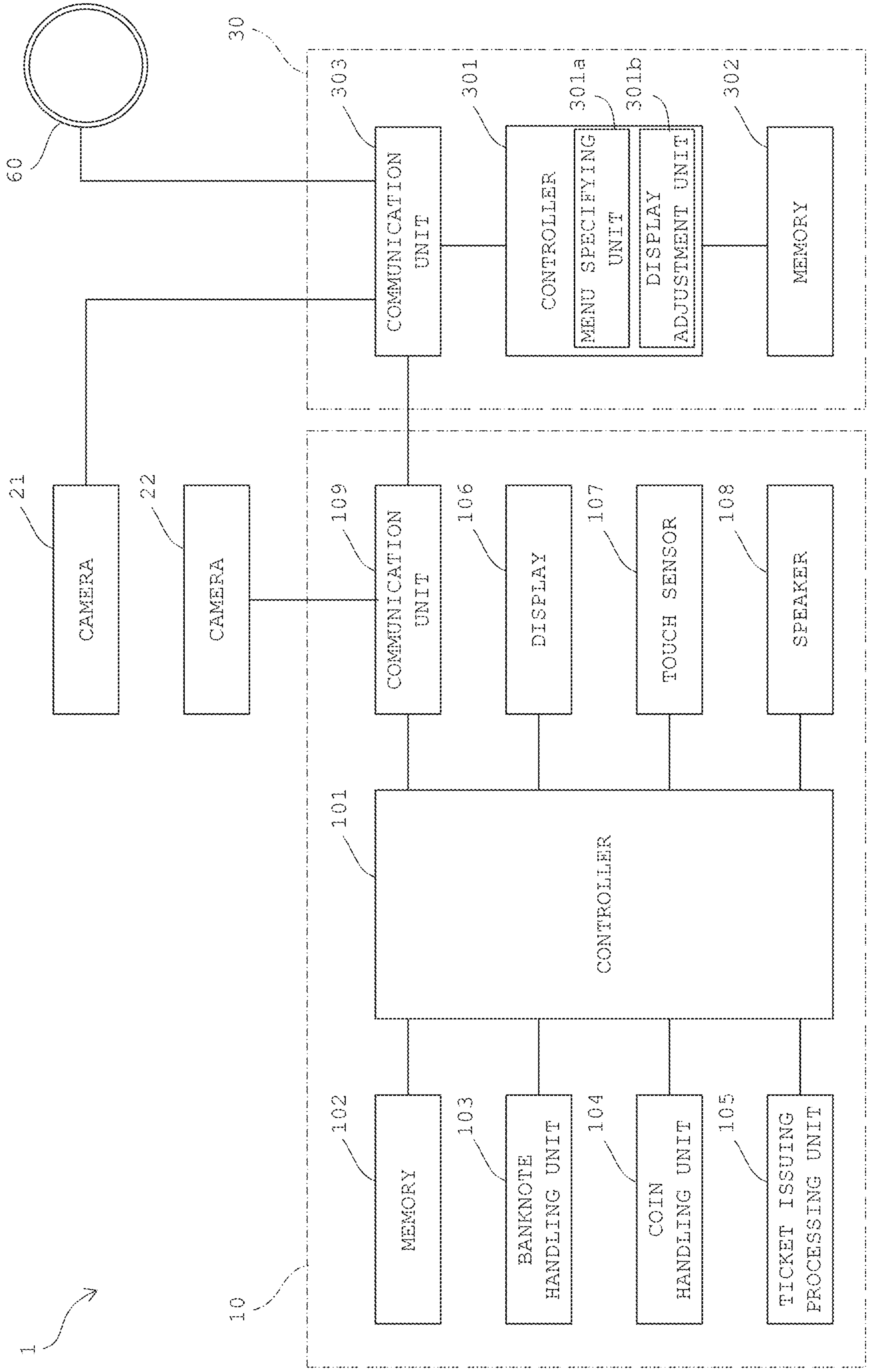
FIG. 3 is a block diagram showing a configuration of the commodity order system according to Embodiment 1.

FIG. 3 is a block diagram showing a configuration of the commodity order system 1.

The ticket vending machine 10 includes a controller 101, a memory 102, a banknote handling unit 103, a coin handling unit 104, a ticket issuing processing unit 105, the display 106, the touch sensor 107, a speaker 108, and a communication unit 109.

The controller 101 includes an arithmetic processing circuit such as a CPU (Central Processing Unit), and controls components according to a program stored in the memory 102.

The memory 102 includes a storage medium such as a ROM (Read Only Memory), a RAM (Random Access Memory), etc., and stores a program executed by the controller 101 and various kinds of data. The memory 102 is used as a work region when the controller 101 performs control. The memory 102 stores a face recognition engine for acquiring face information of the customer 3 from the captured image from the camera 22.

The banknote handling unit 103 includes a banknote storage unit for storing banknotes of each denomination, a transport unit that transports banknotes, and a denomination recognition unit that recognizes the denomination of each banknote that is transported, and the banknote handling unit 103 allows transport of banknotes between the banknote storage unit and the banknote inlet/outlet 12 (see FIG. 1) under control by the controller 101. The coin handling unit 104 includes a coin storage unit for storing coins of each denomination, a transport unit that transports coins, and a denomination recognition unit that recognizes the denomination of each coin that is transported, and the coin handling unit 104 allows transport of coins between the coin storage unit, and the coin inlet 13 and the coin outlet 14 (see FIG. 1) under control by the controller 101.

The ticket issuing processing unit 105 includes a band body generation unit that generates a paper band body, and a printing unit that performs printing on the band body, and the ticket issuing processing unit 105 sends out a ticket obtained by printing a name or the like of a food or a beverage by the printing unit on the band body, to the ticket issuing port 15. The display 106 and the touch sensor 107 form the operation/display unit 11 in FIG. 1. The touch sensor 107 is a transparent film-like member, and is superposed on the display surface of the display 106. The display 106 displays predetermined information under control by the controller 101. The touch sensor 107 outputs coordinate information of the position touched by an operator, to the controller 101. The speaker 108 outputs predetermined audio under control by the controller 101. The outputted audio is outputted to the outside from an audio output window (not shown) formed in the housing of the ticket vending machine 10. The communication unit 109 performs communication with the camera 22 and the information processing apparatus 30 under control by the controller 101.

The information processing apparatus 30 includes a controller 301, a memory 302, and a communication unit 303.

The controller 301 includes an arithmetic processing circuit such as a CPU, and controls components according to a program stored in the memory 302. The memory 302 includes a storage medium such as a ROM, a RAM, a hard disk, etc., and stores a program executed by the controller 301 and various kinds of data. The memory 302 is used as a work region when the controller 301 performs control.

The communication unit 303 performs communication with the camera 21 and the communication unit 109 under control by the controller 301. The communication unit 303 is connected to an external communication network 60 such as the Internet, and performs communication with an apparatus outside the store 2 under control by the controller 301.

In Embodiment 1, functions of a menu specifying unit 301*a* and a display adjustment unit 301*b* are provided to the controller 301 by a program stored in the memory 302.

The menu specifying unit 301*a* specifies a menu medium 40 in which the customer 3 has shown interest, from the captured image from the camera 21, i.e., from the captured image of the customer 3 in the movement path 2*b*1. The display adjustment unit 301*b* executes a process for causing the operation/display unit 11 to display, at least at the arrival timing when the customer 3 has arrived at the facing position P1, a display screen (commodity selection screen) such that a commodity related to the menu medium 40 specified by the menu specifying unit 301*a* with respect to the customer is prioritized as a selection candidate.

In Embodiment 1, direct control of the adjustment of the display screen with respect to the operation/display unit 11 is performed by the controller 101 of the ticket vending machine 10, and information to serve as a trigger or a condition for this control is transmitted from the information processing apparatus 30 to the ticket vending machine 10, by the function of the display adjustment unit 301*b*. That is, the display adjustment unit 301*b* executes indirect control for adjustment of the above display screen with respect to the operation/display unit 11.

Other than this, the memory 302 stores a face recognition engine that allows the controller 301 to extract a face image from the captured image from the camera 21, to acquire face information. The face information that is acquired is information on a feature amount of the face. The face information may be the extracted face image itself.

The memory 302 stores a viewpoint estimation engines that allows the controller 301 to estimate the direction in which the customer 3 views, from the captured image from the camera 21, and estimate whether or not the customer 3 is viewing any of the menu media 40, from the estimated direction. These engines are used by the menu specifying unit 301*a*.

Furthermore, the memory 302 stores an attribute estimation engine that allows the controller 301 to estimate the attribute of each customer such as the age and the sex of the customer, from each piece of face information extracted by the face recognition engine.

The viewpoint estimation engine described above may be a machine learning model, for example. As the machine learning, machine learning using a neural network is applied. For example, a neural network according to deep learning in which neurons are combined in multiple stages is applied. However, the machine learning that is applied is not limited thereto, and another machine learning such as a support vector machine or a decision tree may be applied to the machine learning model.

FIGS. 4A to 4F and FIGS. 5A to 5F each schematically show a generation method for teaching data (state data set) to be used in machine learning.

The state data set is a collection of a large number of pieces of state data. The state data is key point data indicating the positions of a plurality of human body portions, acquired from a person on a captured image acquired by the camera 21. The key point data is acquired by applying a skeleton estimation engine to an image range of the person on the captured image.

In generation of the state data set, a two-dimensional region 70, which is a virtual plane, is set. The two-dimensional region 70 is set so as to have a predetermined positional relationship with respect to the imaging direction (the central axis direction of the imaging field of view) of the camera 21. The two-dimensional region 70 is set so as to be perpendicular to the imaging direction of the camera 21. The center of the two-dimensional region 70 matches the central axis of the imaging field of view of the camera 21. Not limited thereto, for example, an intermediate position on the upper side of the two-dimensional region 70 may match the central axis of the imaging field of view of the camera 21.

The two-dimensional region 70 has a predetermined dimension in each of an X-axis direction (the lateral direction of the imaging field of view) and a Z-axis direction (the vertical direction of the imaging field of view). Here, the shape of the two-dimensional region 70 is a rectangle whose long side is parallel to the X-axis direction. However, the setting method for the two-dimensional region 70 is not limited thereto. For example, the shape of the two-dimensional region 70 may be a square.

The two-dimensional region 70 is divided into a grid shape, whereby a plurality of reference regions 71 are set. Here, the two-dimensional region 70 is divided into a grid shape at the same pitch in the X-axis direction and the Z-axis direction. However, the method for dividing the two-dimensional region 70 into a grid shape is not limited thereto. For example, the division pitch of the two-dimensional region 70 in the X-axis direction and the division pitch of the two-dimensional region 70 in the Z-axis direction may be different from each other.

The state data set, which is teaching data, is a data set obtained by collecting, with respect to the state (posture) of a plurality of persons, for each reference region 71, the state data regarding the state of each person on a captured image when the person has directed his/her line of sight toward the reference region 71.

Figure 4A:
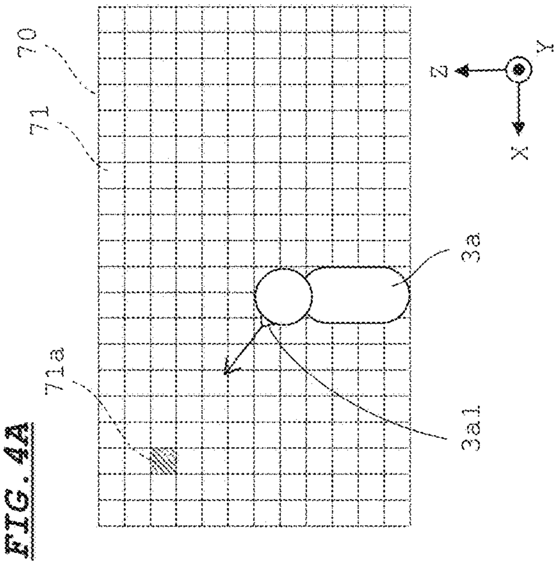
FIG. 4A to FIG. 4F each schematically show a generation method for teaching data (state data set) to be used in machine learning according to Embodiment 1.
Figure 4B:
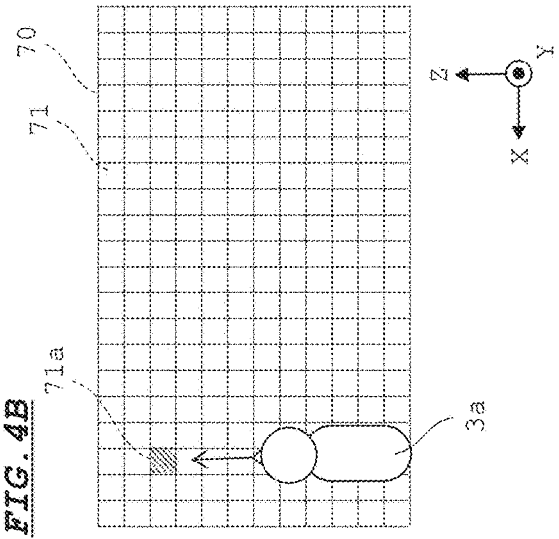
Figure 4C:
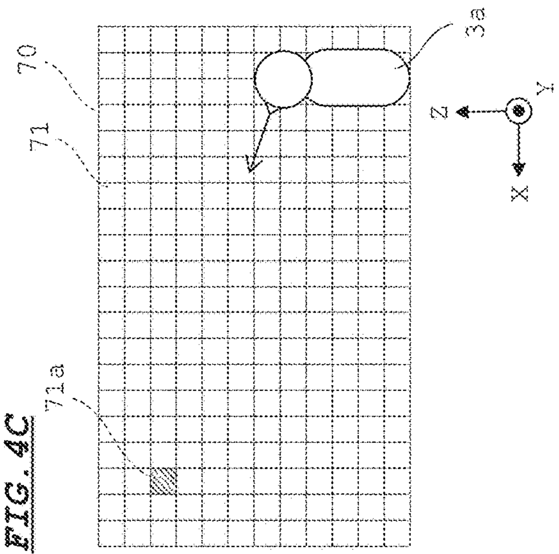
Figure 4D:
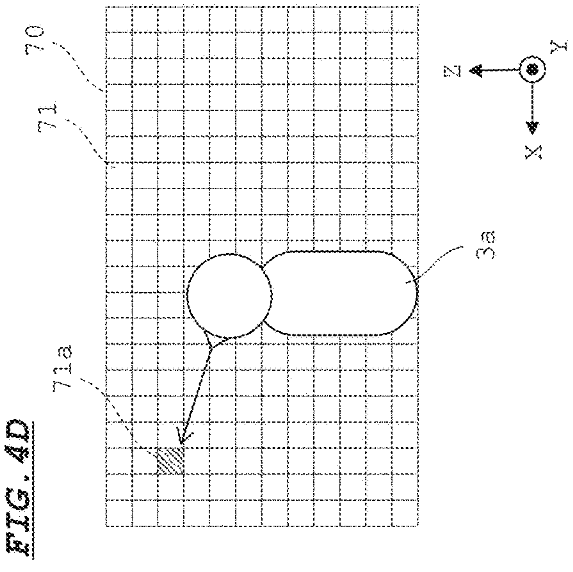
Figure 4E:
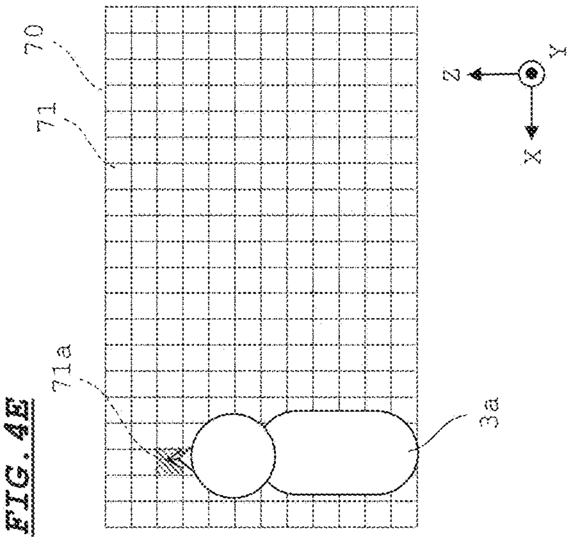
Figure 4F:
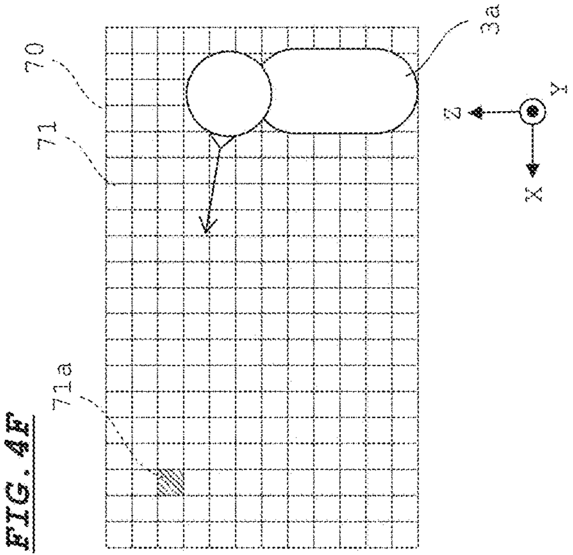
Figure 5C:
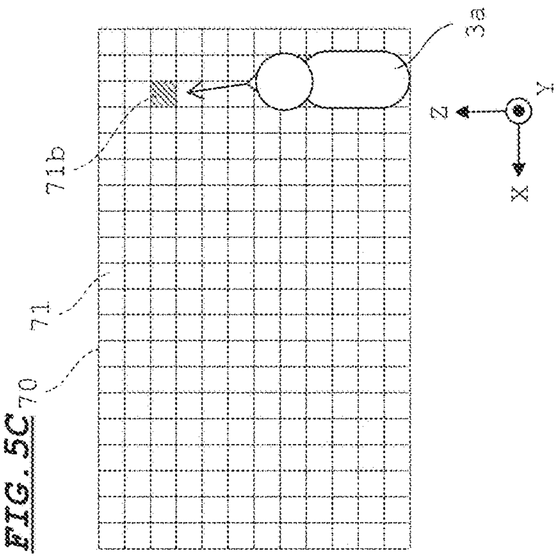
FIG. 5A to FIG. 5F each schematically show a generation method for teaching data (state data set) to be used in machine learning according to Embodiment 1.
Figure 5B:
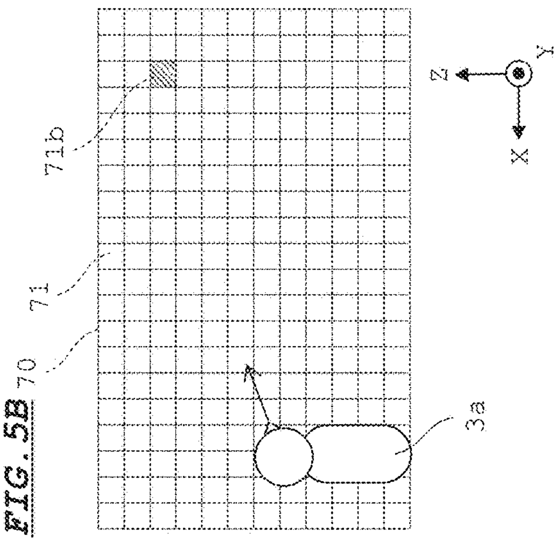
Figure 5A:
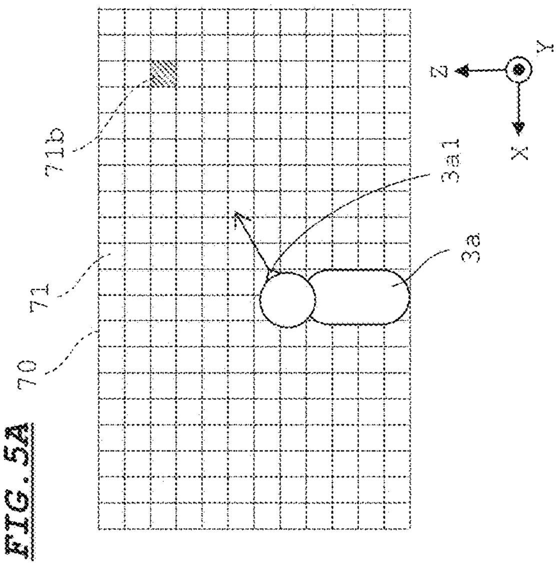
Figure 5F:
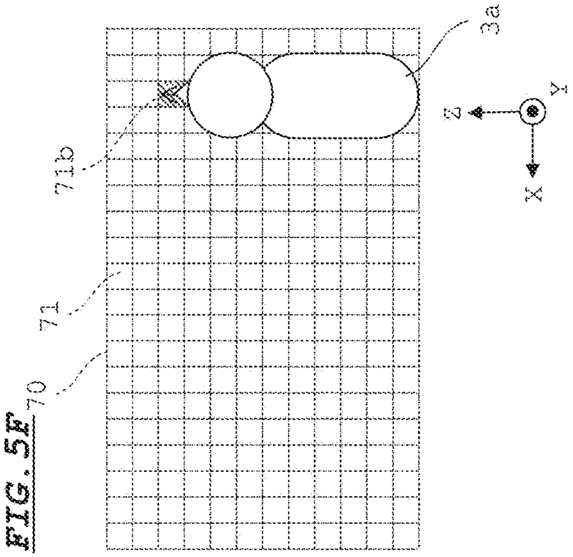
Figure 5E:
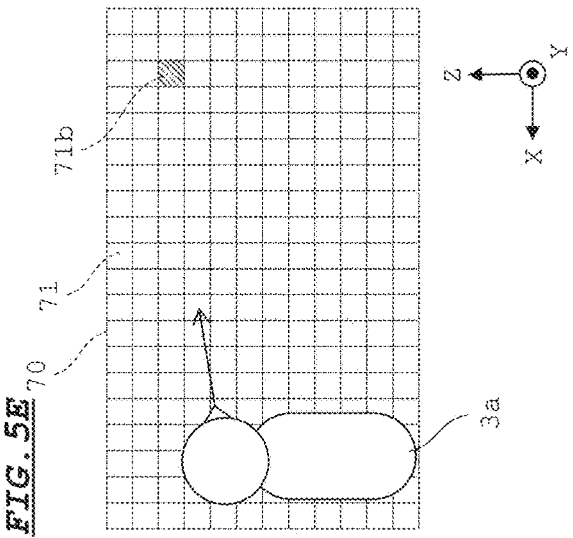
Figure 5D:
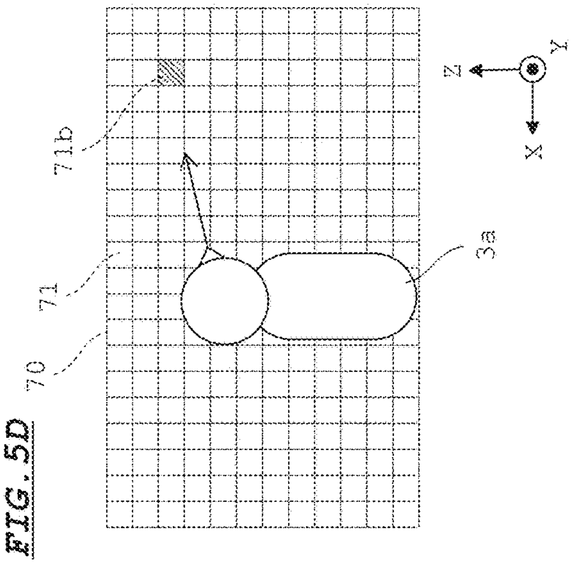

FIGS. 4A to 4F each show the state, viewed from a Y-axis positive side, of a person 3*a* when the person 3*a* has directed his/her line of sight toward a reference region 71*a* at the third row and the third column from the upper left corner (origin) of the two-dimensional region 70. In FIGS. 4A to 4F, an arrow is affixed in the direction in which a nose 3*al* of the person 3*a* is directed. In FIGS. 4D to 4F, the person 3*a* is on the Y-axis positive side as compared with that in FIGS. 4A to 4C, and thus, the range covered by the person 3*a* is large.

In this case, six pieces of state data are acquired with respect to the reference region 71*a*. That is, in the state of the person 3*a* in each of FIGS. 4A to 4F, the key point data is acquired, and the acquired key point data is associated with the reference region 71*a*.

Here, the key point data is acquired as a coordinate position (pixel position) of each human body portion (key point) below on a captured image, for example.

Skeleton center (the center between the left and right shoulders), left ankle, right ankle, left ear, right ear, left elbow, right elbow, left eye, right eye, left thigh, right thigh, left knee, right knee, neck, nose, left shoulder, right shoulder, left wrist, right wrist, left corner of the mouth, and right corner of the mouth.

For acquisition of the key point data, the following method can be used. That is, in an environment in which the relationship between the camera 21 and the two-dimensional region 70 is set to be the above relationship (e.g., the relationship in which the two-dimensional region 70 is set so as to be perpendicular to the imaging direction of the camera 21, and the center of the two-dimensional region 70 matches the central axis of the imaging field of view of the camera 21), at various positions in the imaging field of view of the camera 21, captured images when the person 3*a* has viewed the reference region 71*a* in various postures are actually acquired, each acquired captured image is applied to the skeleton estimation engine, and the coordinate position (pixel position) of each key point in the captured image is extracted.

Alternatively, the key point data when a person views the reference region 71*a* may be acquired by using an extraction engine capable of extracting the key point data in a virtual space. Various extraction engines of this kind have already been developed and are available. The virtual space includes a virtual human body model to which the above key points are affixed in advance. The operator can arbitrarily change the position and the posture of this human body model. In this virtual space, the imaging field of view of the camera 21 and the two-dimensional region 70 are set under the same relationship as above. The operator can direct the line of sight of the human body model to each reference region 71 of the two-dimensional region 70. The operator can cause an extraction engine to extract the coordinate positions, on the captured image from the camera 21, of the key points of the human body model at that time.

In this case, as shown in FIGS. 4A to 4F, the operator performs an operation of changing the position and the posture of the human body model while the line of sight of the human body model corresponding to the person 3*a* is set to the reference region 71*a*, and then, performs an operation of extracting the key point data. As a result, the key point data according to each position and each posture is acquired. The acquired key point data is associated with the reference region 71*a*.

In FIGS. 5A to 5F as well, similar to the above, the state data when the person 3*a* has viewed a reference region 71*b* is acquired by using an extraction engine based on actually performed imaging or a virtual space, and is associated with the reference region 71*b*. With respect to each reference region 71 other than the reference regions 71*a*, 71*b*, a plurality of pieces of state data are acquired by a method similar to the above, and are associated with the corresponding reference region 71.

In FIGS. 4A to 4F and in FIGS. 5A to 5F, six kinds of the state of a person who has viewed the reference regions 71*a*, 71*b* are shown. However, the number of pieces of actual state data associated with one reference region 71 in the state data set is set to be several levels higher than six. From the viewpoint of machine learning, it is preferable that the number of pieces of state data associated with each reference region 71 is as large as possible.

A plurality of input items respectively corresponding to a plurality of portions for which the key point data is acquired are assigned to the input to the machine learning model. A plurality of output items respectively corresponding to the plurality of reference regions 71 of the two-dimensional region 70 are assigned to the output of the machine learning model.

While learning is performed with respect to the machine learning model, the state data set generated as above is sequentially inputted to the plurality of input items of the machine learning model. A plurality of pieces of key point data included in each piece of state data are inputted to the input items of the corresponding portions. When one piece of state data is to be inputted, 100% is set to the output item corresponding to the reference region 71 (the reference region 71 viewed by the person 3*a*) for which this state data has been acquired, and 0% is set to the other output items. In this manner, learning is performed with respect to all of the state data in the state data set.

Through this learning, when the key point data being the state data has been inputted, the machine learning model outputs, from each output item, a probability (0 to 100%) that the line of sight has been directed to the output item. Therefore, when, from the captured image from the camera 21, the key point data (state data) of the customer 3 on the captured image is acquired by means of the skeleton estimation engine, and the acquired key point data is inputted to each corresponding input item, the probability of the output item, among the plurality of output items, corresponding to the reference region 71 viewed by the customer 3 becomes higher than that of the other output items. Therefore, the reference region 71 corresponding to an output item having the highest probability can be acquired as the reference region 71 to which the customer 3 has directed his/her line of sight.

In the information processing apparatus 30, the region of each menu medium 40 disposed in the store 2 is set in advance on the two-dimensional region 70, based on the positional relationship between the camera 21 and the menu medium 40. In the example shown in FIG. 1 and FIG. 2, the arrangement plane of the plurality of menu media 40 is inclined with respect to the two-dimensional region 70 perpendicular to the central axis of the imaging field of view of the camera 21. Therefore, when the regions of the plurality of menu media 40 are respectively projected on the two-dimensional region 70 in a direction parallel to the central axis of the imaging field of view, the region of each menu medium 40 is set on the two-dimensional region 70.

This setting is performed by a manager of the store 2 in accordance with completion of arrangement of the menu media 40. At this time, the manager associates the region of each menu medium 40 on the two-dimensional region 70 and the menu medium 40 (identification information of the menu medium 40) with each other. This association is stored into the memory 302 of the information processing apparatus 30.

The memory 302 in FIG. 3 stores the above learned machine learning model. From the captured image from the camera 21, the menu specifying unit 301*a* acquires, by means of the skeleton estimation engine, the key point data (state data) of the customer 3 on the captured image, and inputs the acquired key point data to each corresponding input item of the machine learning model. The menu specifying unit 301*a* specifies an output item having the highest probability according to this input, and determines whether or not the reference region 71 corresponding to the specified output item is included in the region of any of the menu media 40 set on the two-dimensional region 70. Then, when this determination is YES, the menu specifying unit 301*a* specifies the menu medium 40 corresponding to the region that includes the reference region 71, as the menu medium 40 viewed by the customer 3.

The process for estimating that the customer 3 has viewed a menu medium 40 is not limited to the above example. For example, in the above, the viewpoint estimation engine used by the menu specifying unit 301*a* is a machine learning model based on a neural network. However, a machine learning model other than this may be used as the viewpoint estimation engine. In the above, as the information to be used in the viewpoint estimation, the key point data based on skeleton estimation is used. However, the line of sight may be estimated from a captured image, and whether or not this line of sight is directed to any of the menu media 40 may be determined. Various methods can be used as the process of determining whether or not the customer 3 has viewed a menu medium 40, from the captured image from the camera 21.

When having acquired the face information of the customer 3 from the captured image from the camera 21, the menu specifying unit 301*a* generates gaze status association information indicating the status where the customer 3 has viewed each menu medium 40 in the movement path 2*b*1, and causes the memory 302 to store the gaze status association information.

FIG. 6 shows a configuration of the gaze status association information.

The gaze status association information is configured such that a serial number, face information, and the number of times and time (cumulative time) for which each menu medium 40 has been viewed are associated with each other. “Serial number” is a continuous number that is provided when face information is newly registered in the gaze status association information. “Face information” is the face information of the customer extracted by the face recognition engine described above. “The number of times” is the number of times a corresponding customer 3 has viewed a menu medium 40 (in FIG. 6, menu medium A' to P' corresponding to commodity A to P) corresponding to each commodity in the movement path 2*b*1. “Time” is the total time (cumulative time) for which a corresponding customer has viewed each menu medium 40 in the movement path 2*b*1.

For convenience, FIG. 6 shows a schematic diagram of a face as an item of the face information. However, as described above, the face information is a feature amount extracted from a face image. However, as described above, as the face information, the face image itself may be registered into the gaze status association information. A registration process of the gaze status association information will be described later in detail with reference to FIG. 8.

As shown in FIG. 6, in the gaze status association information, a high value is held in a detection item (the number of times, time) of a menu medium 40 in which each customer 3 has shown interest. Therefore, the gaze status association information can be said to be association information in which the customer 3 and the menu medium 40 in which the customer 3 has shown interest are associated with each other.

FIGS. 7A, 7B show commodity association information and classification association information stored in the memory 102 of the ticket vending machine 10.

The commodity association information in FIG. 7A is information in which a menu medium 40 (here, menu medium A' to P') and a target commodity (here, commodity A to P) of the menu medium 40 are associated with each other. The commodity association information is registered into the ticket vending machine 10 in accordance with the fact that the menu media 40 have been disposed in the store 2, and then, is updated in accordance with update of the menu media 40.

The classification association information in FIG. 7B is information in which a commodity (here, commodity A to Q) handled by the store 2 and classification (here, first classification to third classification) of the commodity are associated with each other. The first classification to the third classification are defined by group conditions different from each other. The classification association information in FIG. 7B also includes a commodity for which no menu medium 40 has been generated.

When the store 2 is a restaurant that handles various commodities, the first classification defines whether the commodity is a main dish or a side dish, and the second classification defines whether the commodity is a food or a beverage, for example. The third classification defines which of noodles, a rice meal (rice, rice bowl dish), a set meal, a salad, a dessert, and a beverage the commodity is. Furthermore, a sub-classification can be set for the third classification. For example, when the third classification is noodles, udon, ramen, pasta, and the like are set as sub-classifications thereof. This association information is registered in the ticket vending machine 10 at the time of opening of the store 2, and then, is updated in accordance with change in the menu.

Registration of the commodity association information and the classification association information is performed by the manager using the operation/display unit 11 of the ticket vending machine 10. The manager performs this registration by setting the ticket vending machine 10 to a registration mode of these pieces of association information. This registration may be performed via the information processing apparatus 30. In this case, the manager operates the information processing apparatus 30 to input these pieces of association information. Upon completion of the input, these pieces of association information are transmitted from the information processing apparatus 30 to the ticket vending machine 10, and are stored into the memory 102 of the ticket vending machine 10.

The commodity association information and the classification association information are used when the ticket vending machine 10 displays a commodity selection screen. A display process of the commodity selection screen in the ticket vending machine 10 will be described later in detail with reference to FIG. 9.

Figure 8:
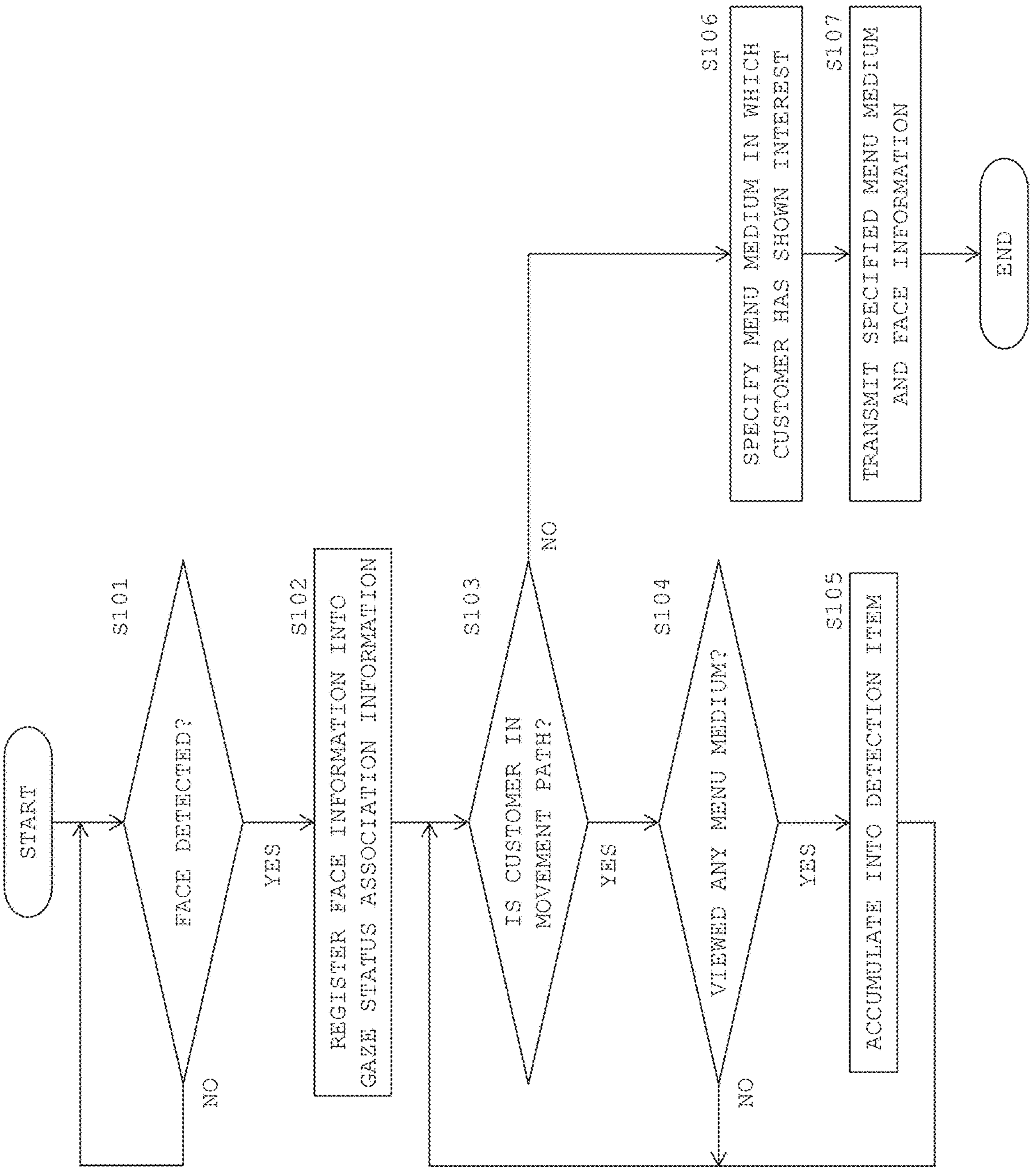
FIG. 8 is a flowchart showing a process performed by a controller of an information processing apparatus in accordance with the fact that a face image has been detected from a captured image from a camera directed to a movement path according to Embodiment 1.

FIG. 8 is a flowchart showing a process performed by the controller 301 of the information processing apparatus 30 in accordance with the fact that a face image has been detected from the captured image from the camera 21.

In the process in FIG. 8, the processes in steps S101 to S106 are executed by the controller 301 using the function of the menu specifying unit 301*a*, and the process in step S107 is executed by the controller 301 using the function of the display adjustment unit 301*b*. In the following, description will be given assuming that the controller 301 performs the process in FIG. 8 using these functions.

When the controller 301 has newly detected the face of a customer 3 on the captured image from the camera 21 (S101: YES), the controller 301 acquires face information from this face, and newly registers the acquired face information into the gaze status association information in FIG. 6 (S102). Through this registration, a serial number is newly assigned, and the new face information is associated with this serial number.

The controller 301 determines whether or not the customer having the detected face is in the movement path 2*b*1 (S103). In the determination in step S103, while the target customer 3 is included in the captured image from the camera 21, YES is determined, and when the customer 3 has passed through the imaging field of view of the camera 21 and has disappeared from the captured image, NO is determined. In a case where the imaging field of view of the camera 21 is large, NO may be determined in step S103 when the customer 3 has reached a position at a predetermined distance, to the entrance 2*a* side, from the facing position P1.

The controller 301 tracks the customer 3 on the captured image from the camera 21, to perform determination in step S103. When the customer 3 is in the movement path 2*b*1 (S103: YES), the controller 301 determines whether or not the customer 3 has viewed any of the menu media 40 (S104).

When the customer 3 has viewed any of the menu media 40 (S104: YES), the controller 301 accumulates a value in the detection item, in the gaze status association information in FIG. 6, corresponding to the viewed menu medium 40 (S105).

Specifically, when the determination in step S104 has turned to YES, the controller 301 adds 1 to "the number of times" corresponding to the viewed menu medium 40. When the determination in step S104 has turned to YES, the controller 301 starts accumulation of a time in "time" corresponding to the viewed menu medium 40, and then, when the determination in step S104 has turned to NO, the controller 301 ends this accumulation.

Then, while the customer 3 is in the movement path 2*b*1 (S103: YES), the controller 301 accumulates values in the detection item associated with the menu medium 40 viewed by the customer 3 (S104: YES, S105).

Then, when the customer 3 has passed through the movement path 2*b*1 (S103: NO), the controller 301 refers to the gaze status association information and specifies the menu medium 40 in which the customer 3 has shown interest (S106).

For example, the controller 301 specifies the menu medium 40 in which the customer 3 has shown the most interest, from the gaze status association information. In this case, a menu medium 40 having the longest "time" in the gaze status association information of the customer 3 is specified as the menu medium 40 in which the customer 3 has shown the most interest. In this specifying, when the longest "time" exists in a plural number, a menu medium 40 having a larger "number of times" is specified as the menu medium 40 in which the customer 3 has shown the most interest. When the "numbers of times" are also the same number, a plurality of menu media 40 are specified as the menu medium 40 in which the customer 3 has shown the most interest.

Here, the menu medium 40 is specified with "time" prioritized over "the number of times". However, the menu medium 40 in which the customer 3 has shown the most interest may be specified with "the number of times" prioritized. Together with the menu medium 40 in which the customer 3 has shown the most interest, the menu media 40 down to a predetermined number (e.g., the second) from the top in the order of the magnitude of the shown interest may be specified as the menu media 40 in which the customer 3 has shown interest.

Then, when the menu medium 40 in which the customer 3 has shown interest has been specified, the controller 301 transmits, to the ticket vending machine 10, information on the specified menu medium 40 and the face information of the customer 3, together with the serial number associated with these (S107). These pieces of information are stored into the memory 102 in the ticket vending machine 10. Then, the controller 301 ends the process in FIG. 8.

When the customer 3 has not viewed any of the menu media 40, the detection items of the menu media 40 associated with the customer 3 all indicate zero. In this case, the controller 301 determines, in step S106, that there is no menu medium 40 in which the customer 3 has shown interest, and in step S107, transmits information indicating this to the ticket vending machine 10, together with the face information and the serial number. In this case, the process in step S107 may be skipped.

The process in FIG. 8 is individually performed for each piece of face information of the customer 3 included in the captured image from the camera 21. The controller 301 may register the face information first acquired from the captured image from the camera 21 into the gaze status association information, and then register the best face information (e.g., the face information closest to that of the frontal view of the face) acquired while the customer 3 is in the movement path 2*b*1, into the gaze status association information in place of the first registered face information.

Figure 9:
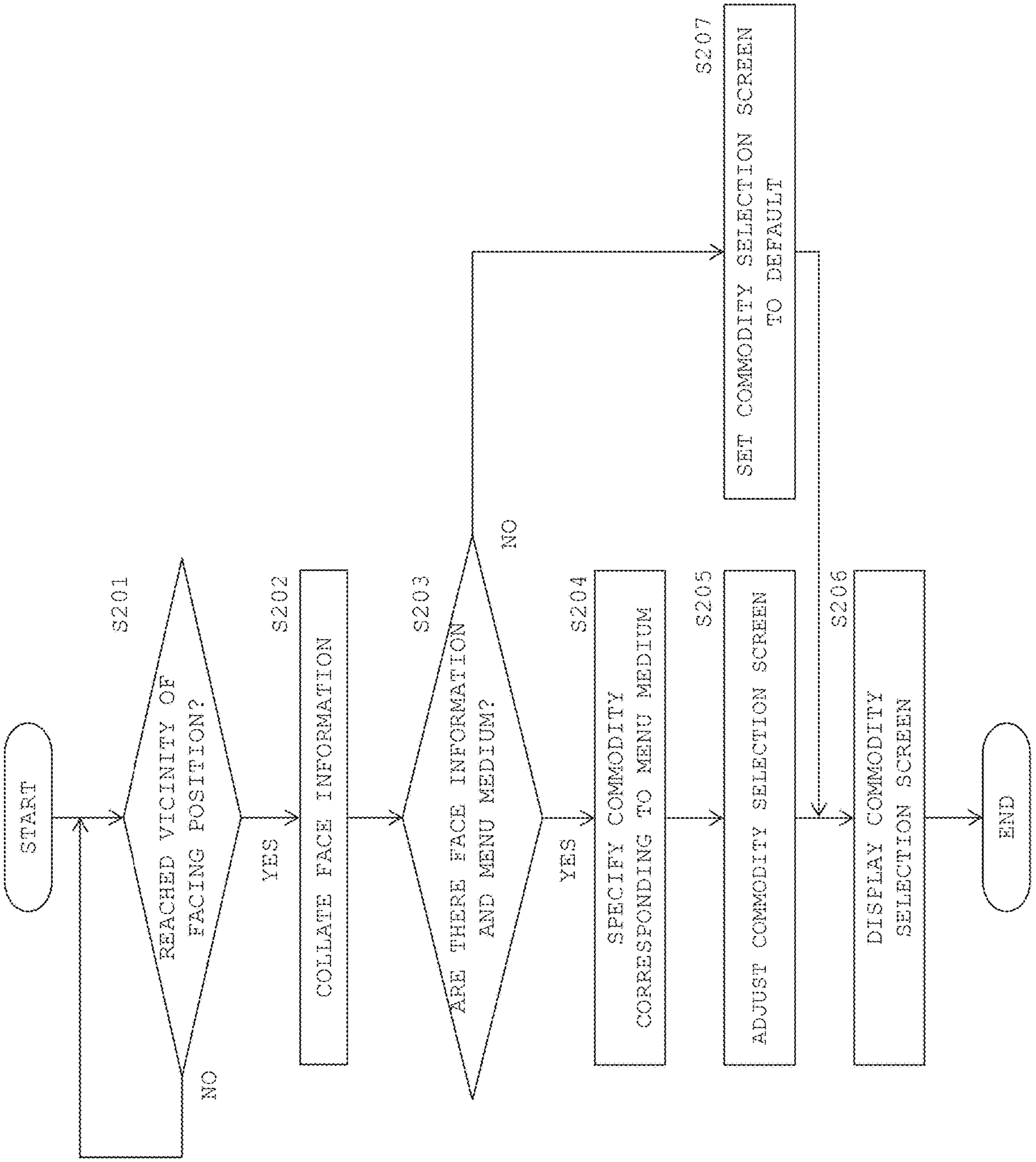
FIG. 9 is a flowchart showing a process performed by a controller of the ticket vending machine in accordance with the fact that a customer has reached the vicinity of a facing position according to Embodiment 1.

FIG. 9 is a flowchart showing a process performed by the controller 101 of the ticket vending machine 10 in accordance with the fact that the customer 3 has reached the vicinity of the facing position P1.

The controller 101 monitors whether or not the customer 3 has reached the vicinity of the facing position P1 described above, through an output or the like from the human detection sensor (S201). When the customer 3 has reached the vicinity of the facing position P1 (S201: YES), the controller 101 acquires face information of the customer 3 from the captured image from the camera 22, and collates the acquired face information with the face information received from the information processing apparatus 30 in a most recent predetermined period through the process in step S107 in FIG. 8 (S202).

Here, with respect to the face information that is acquired from the captured image from the camera 22, the largest face image, among face images included in the captured image, that is in the vicinity of the center, serves as the target. That is, the face information that is acquired in step S202 is the face information that is acquired from the customer 3 (the customer 3 who operates the operation/display unit 11) at the facing position P1.

The controller 101 receives, from the information processing apparatus 30, the face information that is consistent with the face information acquired from the captured image from the camera 22, and further determines whether or not information indicating the menu medium 40 in which the customer 3 has shown interest has been received from the information processing apparatus 30 together with this face information (S203). When the determination in step S203 is NO, the controller 101 sets the commodity selection screen to be displayed on the operation/display unit 11 to a default selection screen (S207).

One event in which the determination in step S203 becomes NO is a case where the face information of the customer 3 in the movement path 2*b*1 has not been able to be acquired from the captured image from the camera 21, for example.

Another event in which the determination in step S203 becomes NO is a case where, although the face information acquired from the captured image from the camera 22 is consistent with one piece of the above face information received from the information processing apparatus 30, information indicating a menu medium 40 has not been received from the information processing apparatus 30 together with this face information.

That is, as described above, in the gaze status association information, when zero is indicated in the detection items (the number of times, time) of all of the menu media 40 associated with this face information, the information processing apparatus 30 transmits information indicating that no menu medium 40 has been specified, together with this face information. In this case, since there is no menu medium 40 corresponding to this face information, the determination in step S203 becomes NO.

On the other hand, when the acquired face information matches one piece of the above face information received from the information processing apparatus 30, and information specifying the menu medium 40 in which the customer 3 has shown interest has been received together with this face information (S203: YES), the controller 101 specifies a commodity corresponding to this menu medium 40 from the association information in FIG. 7A (S204), and adjusts the commodity selection screen such that the commodity having been specified is prioritized as a selection candidate (S205).

The controller 101 causes the operation/display unit 11 to display the commodity selection screen set in step S205 or step S207 (S206). Then, the controller 101 ends the process in FIG. 9.

Figure 10:
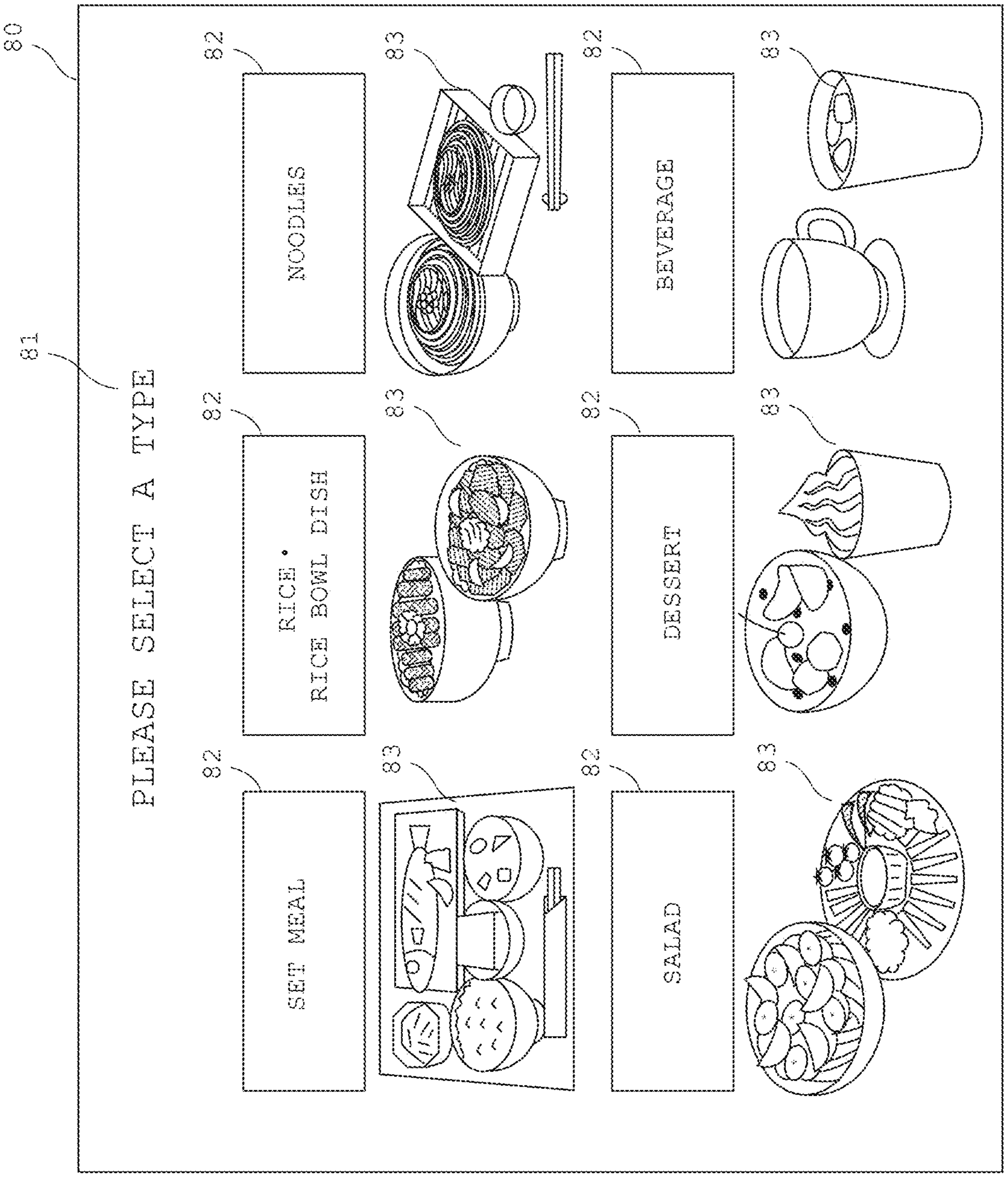
FIG. 10 shows a selection screen in an initial state when a commodity selection screen is set as a default screen according to Embodiment 1.

FIG. 10 shows a selection screen 80 in an initial state when the commodity selection screen has been set to the default screen through step S207 in FIG. 9.

Here, the commodity selection screen is composed of a plurality of layers of selection screens. FIG. 10 shows the selection screen 80 in the initial state, which is the first layer among these selection screens.

The selection screen 80 includes a message 81 that urges selection of a commodity type, buttons 82 each for selecting a commodity type, and illustrative images 83 of representative commodities included in respective commodity types. Each illustrative image 83 is disposed immediately below the button 82 of a corresponding commodity type. These commodity types correspond to the classification of the third classification in the classification association information in FIG. 7B.

As shown in FIG. 10, in the selection screen 80 in the initial state set as the default, sets of a button 82 and an illustrative image 83 are uniformly disposed with respect to all of the commodity types. Therefore, while equally treating all of the commodity types without preference, the customer 3 selects one of the commodity types. When the customer 3 has touched one of the buttons 82 in the selection screen 80, the controller 101 causes a selection screen of a second layer that includes a commodity group belonging to the type of the button 82, to be displayed.

Figure 11:
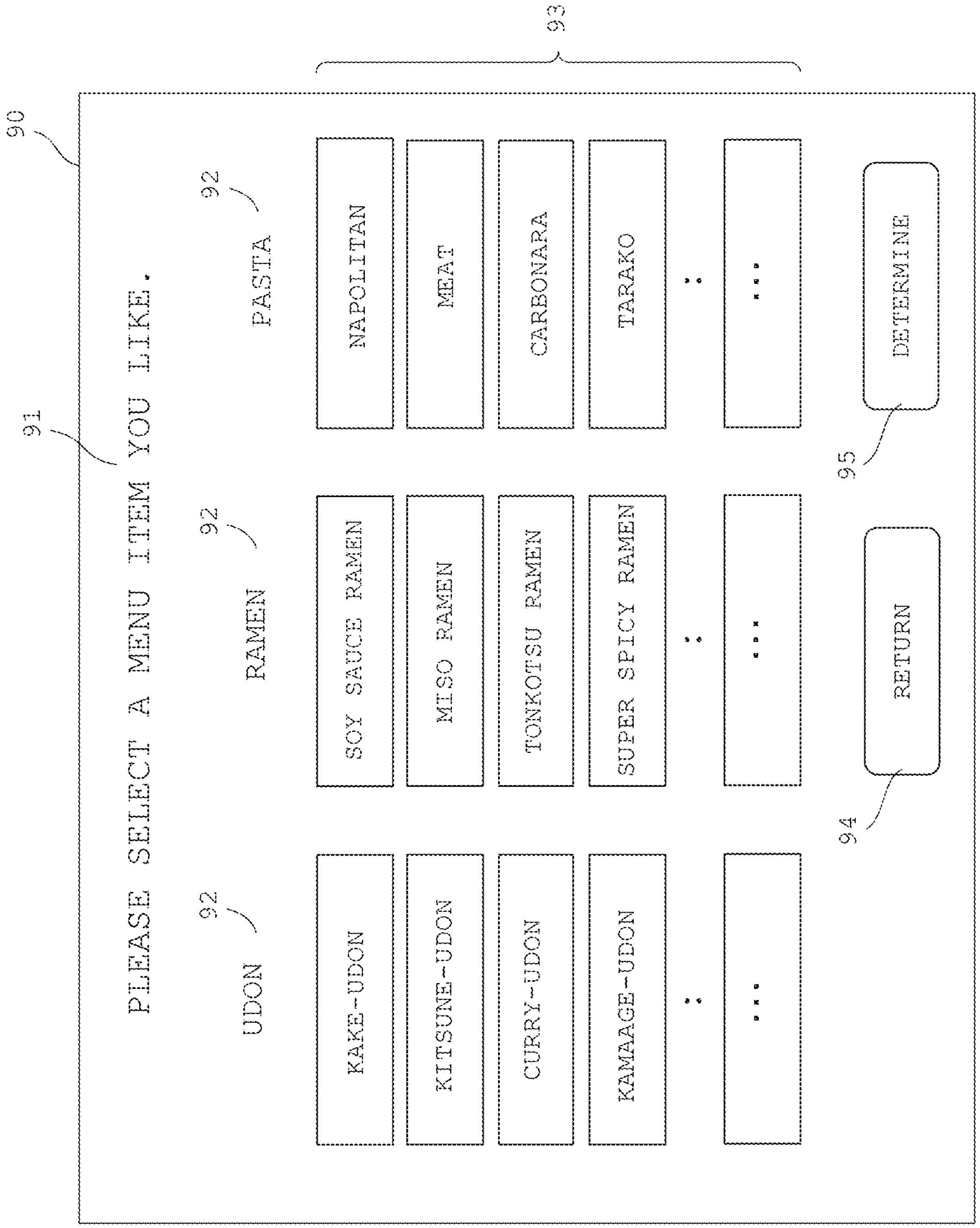
FIG. 11 shows a selection screen of a second layer according to Embodiment 1.

FIG. 11 shows a selection screen 90 of the second layer to be displayed when the button 82 for “noodles” has been operated in the selection screen 80 in FIG. 10.

The selection screen 90 includes a message 91 that urges selection of a commodity, indications 92 each indicating a sub-classification (here, udon, ramen, pasta) of the commodity type, buttons 93 each for selecting a commodity, a button 94 for returning the screen to one layer before, and a button 95 for determining the selection. The customer 3 touches a button 93 corresponding to the commodity, in the displayed commodity group, that the customer desires, and touches the button 95. Accordingly, the screen is shifted to a screen for a payment process. If the customer 3 touches the button 94, the customer 3 can redo the commodity selection. Before the screen is shifted to the screen for the payment process, selection of another commodity may further be allowed.

Figure 12:
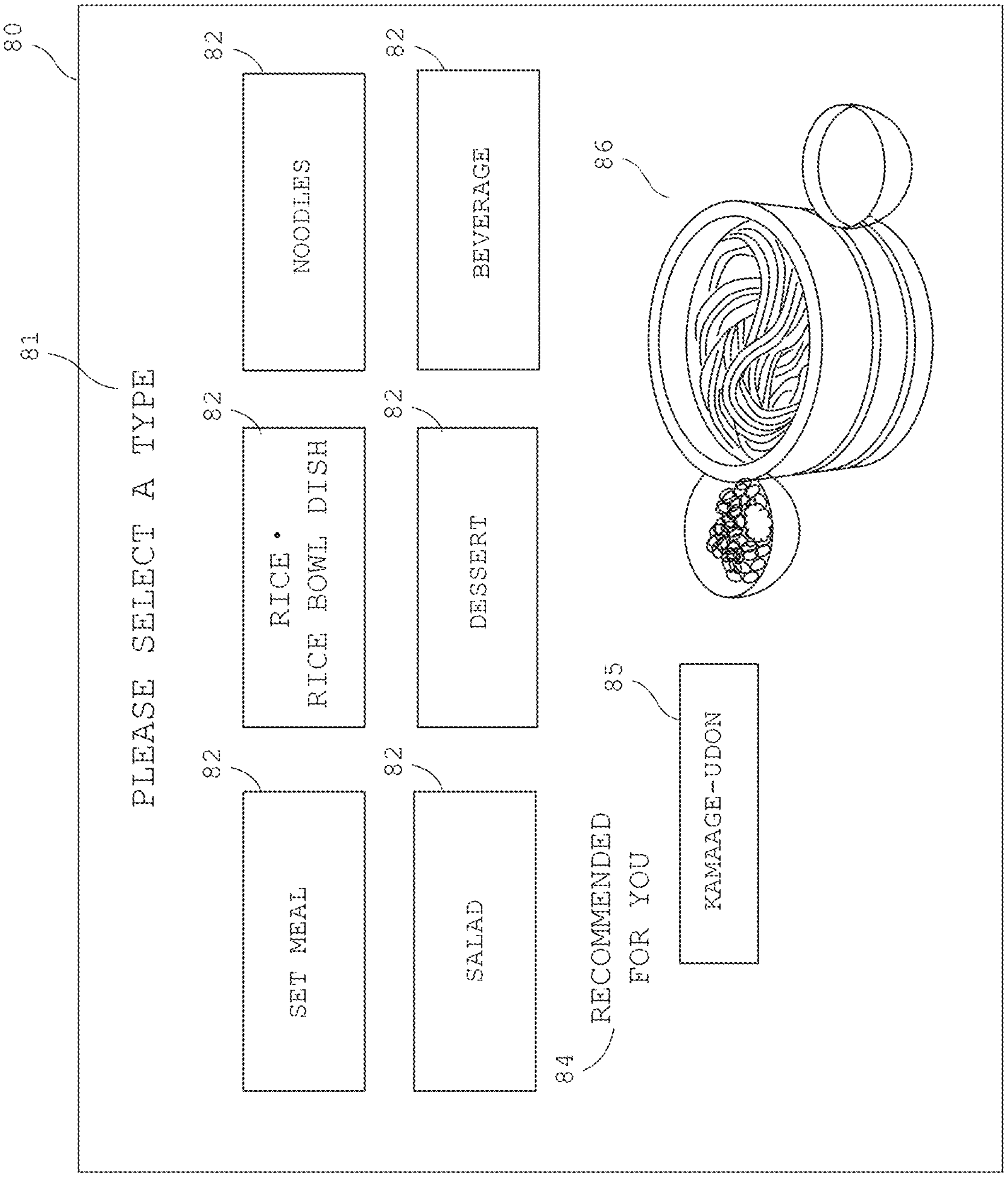
FIG. 12 shows the selection screen in the initial state when the commodity selection screen has been adjusted according to Embodiment 1.

FIG. 12 shows the selection screen 80 in the initial state when the commodity selection screen has been adjusted through step S205 in FIG. 9.

The selection screen 80 in this case also includes the message 81 and the buttons 82 corresponding to the respective types. However, in this selection screen, the illustrative image 83 corresponding to each button 82 is omitted, and the layout of the buttons 82 has been changed accordingly. In addition, this selection screen 80 includes a message 84 that recommends selection of a predetermined commodity, and further, includes a button 85 for selecting this commodity and an illustrative image 86 of this commodity.

Here, the commodity displayed as a recommendation is a commodity corresponding to the menu medium 40 in which the customer 3 has shown interest in the movement path 2*b*1. From the commodity association information in FIG. 7A, the controller 101 acquires a commodity corresponding to the menu medium 40 that forms a set, among sets of the face information (first face information) and the menu medium 40 received from the information processing apparatus 30, with the first face information that is consistent with the face information (second face information) acquired from the camera 22. Then, the controller 101 causes the button 85 for selecting the acquired commodity to be included in the selection screen 80 as in FIG. 12, and further, causes the illustrative image 86 of this commodity to be included in the selection screen 80.

As described above, in the gaze status association information, when there are a plurality of menu media 40 being at the top and having the same number in "time" and "the number of times", or when the menu media 40 down to a predetermined number from the top are specified as the menu media 40 in which the customer 3 has shown interest, a plurality of menu media 40 are included in the set of the face information and the menu medium 40 received from the information processing apparatus 30. In this case, with respect to all of the menu media 40 in the combinations, a set of a button 85 and an illustrative image 86 may be displayed on the selection screen 80.

In this selection screen 80, when the button 85 has been touched, display of the selection screen 90 in FIG. 11 is skipped, and the screen is shifted to the screen for the payment process. Therefore, the customer 3 can smoothly and quickly select a commodity corresponding to the menu medium 40 in which the customer 3 has shown interest in the movement path 2*b*1. In this case as well, the customer 3 can operate a button 82 for selecting a commodity type, to select a commodity other than the recommended commodity. In this case, the selection screen 90 of the second layer similar to that in FIG. 11 is displayed.

Figure 13:
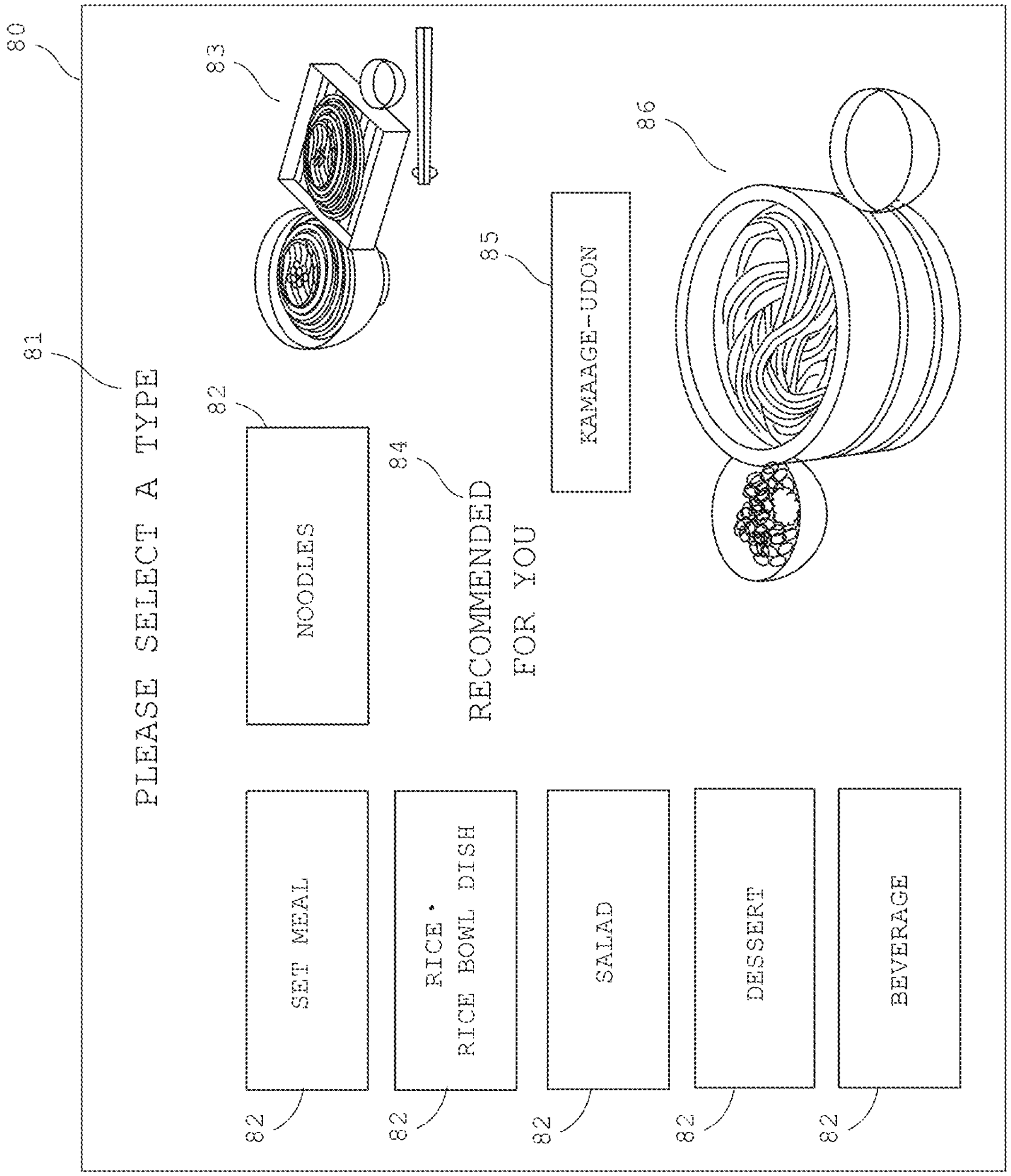
FIG. 13 shows another configuration example of the selection screen in the initial state when the commodity selection screen has been adjusted according to Embodiment 1.
Figure 14:
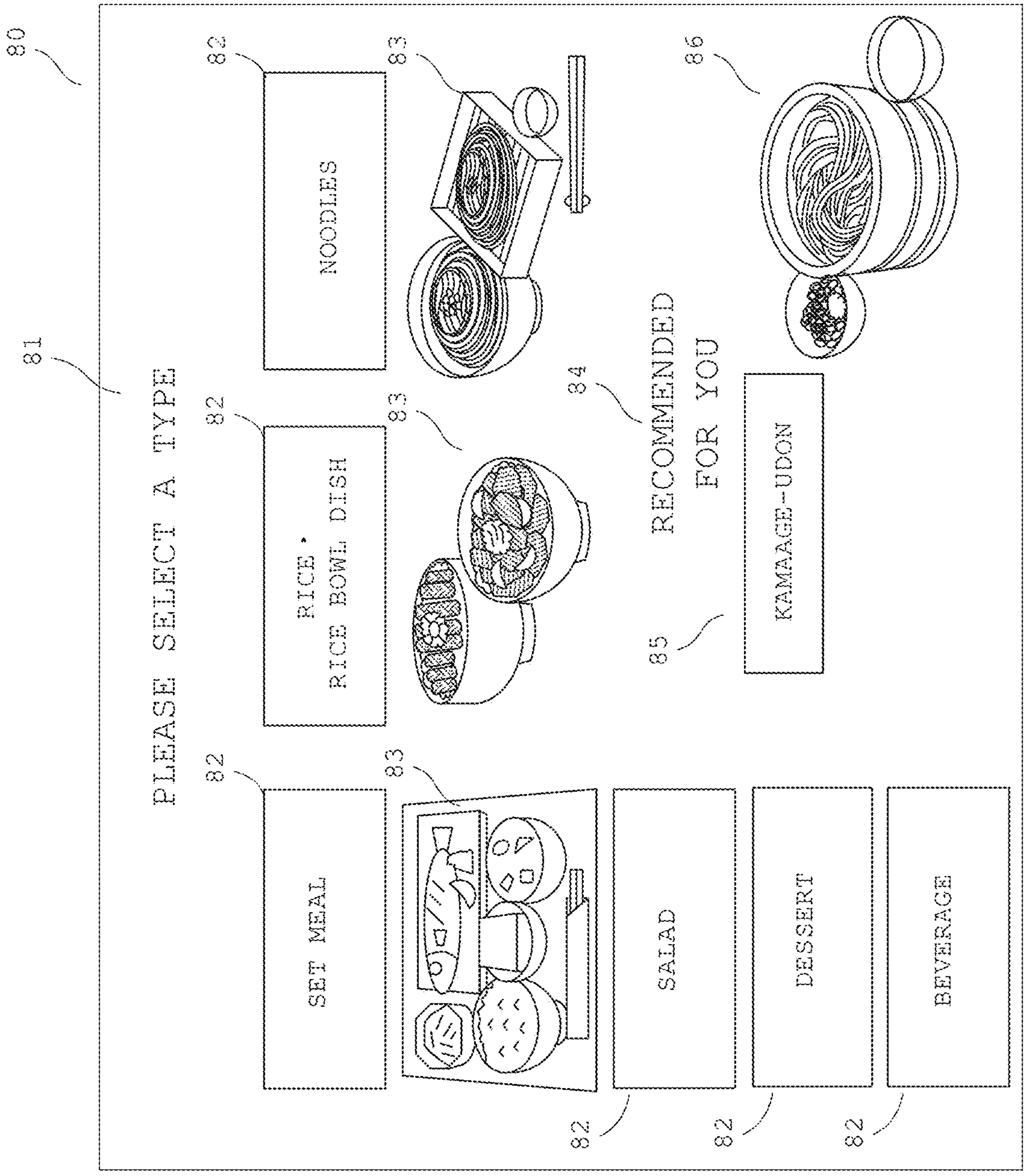
FIG. 14 shows still another configuration example of the selection screen in the initial state when the commodity selection screen has been adjusted according to Embodiment 1.

Instead of the screen in FIG. 12, a screen in FIG. 13 or FIG. 14 may be displayed as the selection screen 80 in the initial state.

In the selection screen 80 in FIG. 13, to a lateral side of the button 82 corresponding to the type (here, noodles) including the recommended commodity indicated by the button 85, an illustrative image 83 of a representative commodity of the type is displayed. Accordingly, this type is displayed more effectively by the illustrative image 83 than the other types. Therefore, when not selecting the commodity indicated by the button 85, the customer 3 can smoothly select a commodity group of the same kind (noodles) as this.

In the selection screen 80 in FIG. 14, below the button 82 of each commodity type (here, main dish) that satisfies a predetermined group condition (here, a condition of main dish/side dish being the first classification in FIG. 7B) with respect to the recommended commodity indicated by the button 85, an illustrative image 83 of a representative commodity of the type is displayed. In this case, these types are displayed more effectively by the illustrative image 83 than the other types. Therefore, when not selecting the commodity indicated by the button 85, the customer 3 can smoothly select a commodity group of the same kind (main dish) as this.

<Transmission of Purchase Result>

The controller 101 of the ticket vending machine 10 may transmit, to the information processing apparatus 30, information on the commodity actually purchased by the customer 3 having reached the facing position P1. In this case, the controller 101 may transmit, to the information processing apparatus 30, relationship information indicating the relationship between the commodity (hereinafter, referred to as "specified commodity") corresponding to the menu medium 40 received from the information processing apparatus 30 in combination with the face information of the customer 3, and the commodity (hereinafter, referred to as "purchased commodity") actually purchased by the customer 3.

For example, as the above relationship information, the controller 101 may transmit, to the information processing apparatus 30, information indicating match/mismatch between the specified commodity and the purchased commodity, and, in the case of a mismatch, information indicating the similarity between both commodities. As the information indicating the similarity, information indicating whether or not each classification defined in the classification association information in FIG. 7B matches between the specified commodity and the purchased commodity can be included. The evaluation criterion for similarity is not limited thereto, and may be another evaluation criterion.

The controller 101 transmits, to the information processing apparatus 30, information (e.g., commodity name) for identifying the specified commodity and the purchased commodity, the above relationship information, and the serial number received together with the specified commodity. The controller 301 of the information processing apparatus 30 sequentially stores these pieces of received information in association with each other.

At this time, further, the controller 301 may extract, from the face information associated with this serial number in the gaze status association information, attribute information such as the sex and the age of the customer 3, and further associate this attribute information with the information described above. The attribute information of the customer 3 may be acquired from the captured image (the captured image from the camera 21) of the customer 3 in the movement path 2*b*1, and registered, in advance, in association with the gaze status association information of the customer 3. The attribute information may include attributes (e.g., the height, the color of clothes, etc.) other than the sex and the age of the customer.

FIG. 15 shows a configuration of purchase management information for managing the commodity purchase status of the customer 3 in the store 2.

The controller 301 of the information processing apparatus 30 registers, into the purchase management information in FIG. 15, the above-described information received as appropriate from the ticket vending machine 10 in accordance with purchase of a commodity. "Serial number" in the purchase management information is the same as the "serial number" in the gaze status association information in FIG. 6, and with this "serial number", the purchase management information and the gaze status association information are associated with each other.

With this purchase management information, effectiveness of the menu media 40 can be evaluated, for example. That is, based on information in the items "match/mismatch" and "similarity", whether or not the menu medium 40 has evoked purchase of the commodity or a similar commodity can be evaluated, and further, this evaluation can be performed in detail for each attribute of the customer 3.

Such evaluation may be performed by the manager on the information processing apparatus 30, or may be performed in an external evaluation tool (server, etc.). In the latter case, the purchase management information in FIG. 15 is transmitted from the information processing apparatus 30 at a predetermined timing (e.g., every other day, every other week, etc.) to the external evaluation tool. Then, the information processing apparatus 30 receives an evaluation result of the purchase management information in the store 2 from the evaluation tool. This evaluation result may include analysis of marketing of the store 2, in addition to the effectiveness of the menu media 40 as above.

Generation of the relationship information may be performed by the information processing apparatus 30. In this case, information similar to the classification association information in FIG. 7B is stored in advance in the memory 302 of the information processing apparatus 30.

Effects of Embodiment 1

As shown in FIG. 1 to FIG. 3, and FIG. 12, the information processing apparatus 30 includes: the menu specifying unit 301*a* that specifies the menu medium 40 in which the customer 3 has shown interest, from the captured image of the customer 3 in the movement path 2*b*1; and the display adjustment unit 301*b* that executes a process for causing the operation/display unit 11 (display) to display, at least at the arrival timing when the customer 3 has arrived at the facing position P1, the commodity selection screen 80 (display screen) such that a commodity related to the menu medium 40 specified by the menu specifying unit 301*a* with respect to the customer 3 is prioritized as a selection candidate.

With this configuration, a commodity related to the menu medium 40 in which the customer 3 has shown interest in the movement path 2*b*1 is displayed as a selection candidate in a prioritized manner on the commodity selection screen (display screen), at least at the timing when the customer 3 has arrived at the facing position P1. Therefore, the commodity in which the customer 3 has shown interest can be smoothly and quickly displayed as a selection candidate. Accordingly, convenience in commodity selection for the customer 3 can be enhanced.

As described above, transmission in step S107 is performed at a timing when the customer 3 has deviated from the movement path 2*b*1, and the process in FIG. 9 is started at a timing when the customer 3 has reached the vicinity of the facing position P1, i.e., a position separated from the operation/display unit 11 (display) by a predetermined distance (e.g., several tens of cm) from the facing position P1, in step S201. Therefore, the above selection screen 80 (display screen) that is displayed through the process performed by the display adjustment unit 301*b* is displayed at least at the timing when the customer 3 has arrived at the facing position P1.

As shown in FIG. 6, the menu specifying unit 301*a* acquires at least one of the number of times and the cumulative time for which the customer 3 has viewed each of the menu media 40 in the movement path 2*b*1, and specifies the menu medium 40 in which the customer 3 has shown interest, based on at least one of the number of times and the cumulative time.

Therefore, the interest of the customer 3 in each of the menu media 40 can be comprehensively determined. Therefore, a commodity according to the interest of the customer 3 can be appropriately displayed as a selection candidate.

As described with reference to FIGS. 4A to 4F and FIGS. 5A to 5F, the menu specifying unit 301*a* estimates a direction in which the customer 3 views, from the captured image from the camera 21, performs determination as to whether or not the menu media 40 are present in the direction, and specifies the menu medium 40 in which the customer 3 has shown interest, based on the result of the determination.

Since the process of estimating the direction in which the customer 3 views is used, which menu medium 40 the customer 3 has viewed can be appropriately determined. Therefore, from this determination result, the menu medium 40 in which the customer 3 has shown interest can be accurately specified.

As shown in FIG. 6, the menu specifying unit 301*a* generates the gaze status association information (association information) in which the customer 3 and the menu medium 40 in which the customer 3 has shown interest are associated with each other. Based on the gaze status association information (association information), the display adjustment unit 301*b* performs transmission of information in step S107 in FIG. 8, thereby causing the operation/display unit 11 (display) to display the selection screen 80 (display screen) such that a commodity related to the menu medium 40 in which the customer 3 has shown interest is prioritized as a selection candidate.

Thus, since the gaze status association information (association information) is prepared while the customer 3 moves to the facing position P1, the selection screen 80 (display screen) according to the interest of the customer 3 can be smoothly presented to the customer 3.

As shown in FIG. 6, the menu specifying unit 301*a* acquires the face information of the customer 3 from the captured image from the camera 21, and associates the menu medium 40 in which the customer 3 has shown interest with the acquired face information.

Accordingly, without use of means for tracking the customer 3 who moves from the movement path 2*b*1 toward the facing position P1, when, in step S202 in FIG. 9, the face information of the customer 3 acquired from the captured image from the camera 22 in the vicinity of the facing position P1 is collated with the face information acquired by the menu specifying unit 301*a*, the menu medium 40 in which the customer 3 has shown interest can be smoothly specified.

As shown in FIG. 1 and FIG. 2, the menu media 40 are disposed in the store 2, and the menu specifying unit 301*a* specifies the menu medium 40 in which the customer has shown interest, from the captured image of the customer 3 in the movement path 2*b*1 in the store 2.

With this configuration, the menu medium 40 in which the customer 3 has shown interest can be specified from the captured image of the customer 3 who moves in the store 2.

As shown in FIG. 12 to FIG. 14, the commodity selection screen 80, 90 that is displayed on the operation/display unit 11 (display) is composed of a plurality of layers, and the ticket vending machine 10 (commodity order apparatus) causes the button 85 (selection item) for a commodity corresponding to the menu medium 40 specified by the menu specifying unit 301*a* to be included in the selection screen 80 in the initial state that is displayed on the operation/display unit 11 (display).

With this configuration, since the button 85 (selection item) for the commodity corresponding to the menu medium 40 in which the customer 3 has shown interest is included in the selection screen 80 in the initial state, the customer 3 can smoothly select the commodity in which the customer 3 has shown interest.

As shown in FIG. 13, the selection screen 80 in the initial state includes a plurality of buttons 82 (type selection items)

each for selecting a commodity type, and the ticket vending machine 10 (commodity order apparatus) causes a representative illustrative image 83 to accompany a button 82 (type selection item), among the plurality of buttons 82 (type selection items) displayed on the selection screen 80 in the initial state, of the commodity type of noodles including the commodity corresponding to the menu medium 40 specified by the menu specifying unit 301*a*, thereby causing this button 82 (type selection item) to be effectively displayed as compared with the other buttons 82 (type selection items).

Accordingly, the button 82 (type selection item) of the commodity type including the commodity corresponding to the menu medium 40 in which the customer 3 has shown interest is effectively displayed. Therefore, when not selecting the commodity in which the customer 3 has shown interest, the customer 3 can smoothly select a commodity of the same type as this.

As shown in FIG. 14, the selection screen 80 in the initial state includes a plurality of buttons 82 (type selection items) each for selecting a commodity type, and the ticket vending machine 10 (commodity order apparatus) causes a representative illustrative image 83 to accompany each of the buttons 82 (type selection items), among the plurality of buttons 82 (type selection items) displayed on the selection screen 80 in the initial state, of commodity types (here, set meal, rice/rice bowl dish, noodles as a main dish) that satisfy a predetermined group condition (here, main dish/side dish of the first classification in FIG. 7B) with respect to the commodity corresponding to the menu medium 40 specified by the menu specifying unit 301*a*. Accordingly, these buttons 82 (type selection items) are effectively displayed as compared with the other buttons 82 (type selection items).

With this configuration, the buttons 82 (type selection items) of other commodity types that satisfy the predetermined group condition with respect to the commodity corresponding to the menu medium 40 in which the customer 3 has shown interest are effectively displayed. Therefore, when not selecting the commodity in which the customer 3 has shown interest, the customer 3 can smoothly select a commodity of the same type as this and a commodity similar to this.

As shown in FIG. 8, the controller 301 of the information processing apparatus 30 executes a first process for specifying the menu medium 40 in which the customer 3 has shown interest, from the captured image of the customer 3 in the movement path 2*b*1 (S103 to S106), and a second process (S107) for causing the operation/display unit 11 (display) to display, at least at the arrival timing when the customer 3 has arrived at the facing position P1, the selection screen 80 (display screen) such that a commodity related to the menu medium 40 specified with respect to the customer 3 is prioritized as a selection candidate.

Accordingly, the above-described effects are exhibited by the information processing apparatus 30.

As shown in FIG. 8, a program stored in the memory 302 causes the information processing apparatus 30 to execute: a function (S103 to S106) of specifying the menu medium 40 in which the customer 3 has shown interest, from the captured image of the customer 3 in the movement path 2*b*1; and a function (S107) for causing the operation/display unit 11 (display) to display, at least at the arrival timing when the customer 3 has arrived at the facing position P1, the selection screen 80 (display screen) such that a commodity related to the menu medium 40 specified with respect to the customer 3 is prioritized as a selection candidate.

According to the third aspect and the fourth aspect of the present invention, effects similar to those in the above first aspect are exhibited.

Accordingly, the above-described effects by the information processing apparatus 30 are exhibited.

Embodiment 2

Figure 16:
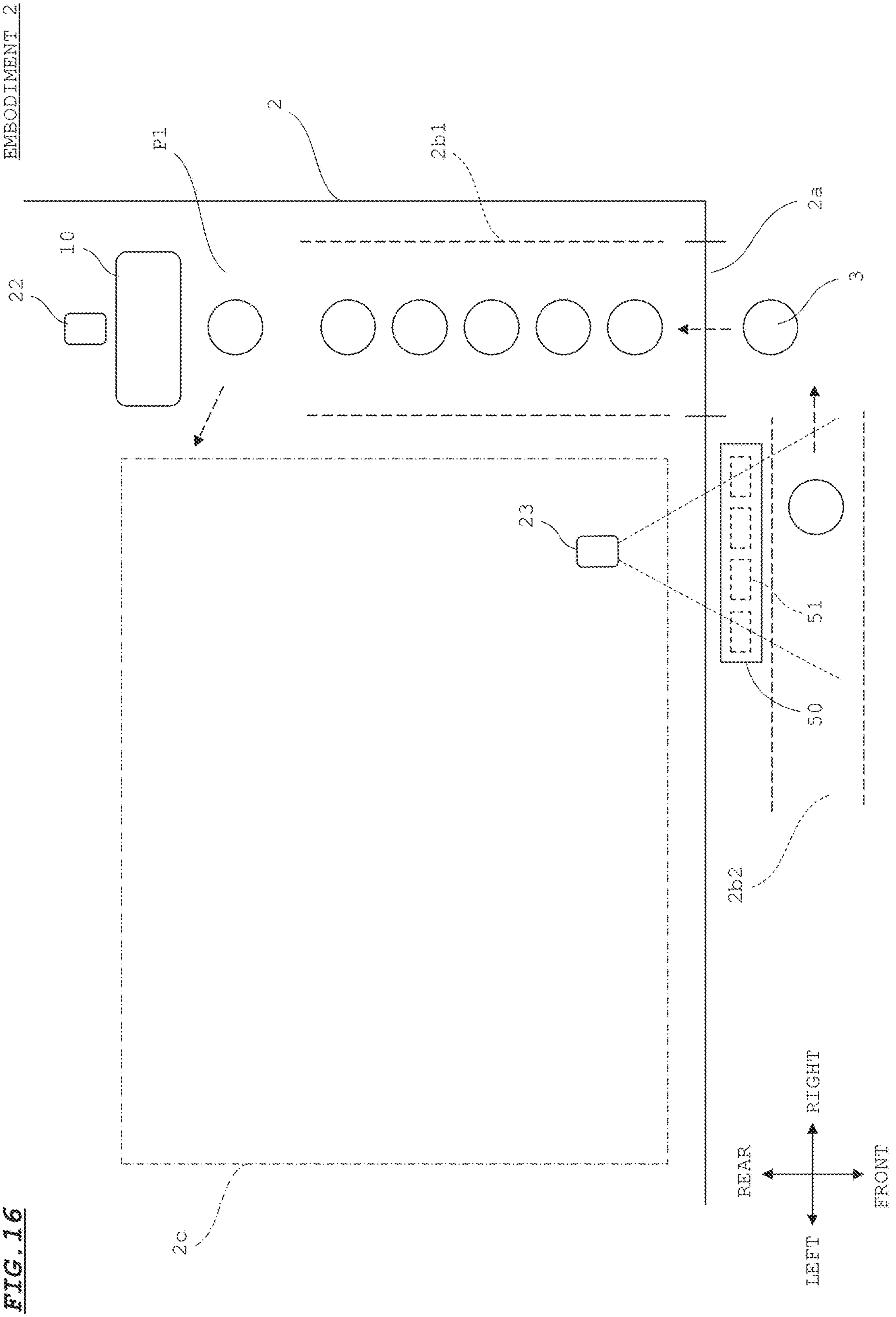
FIG. 16 is a plan view schematically showing an arrangement example of the ticket vending machine, a camera, and the menu media in the store according to Embodiment 2.

FIG. 16 is a plan view schematically showing an arrangement example of the ticket vending machine 10, a camera 23, and the menu media 51 in the store 2 according to Embodiment 2.

In Embodiment 2, the camera 21 and the menu media 40 are omitted from the arrangement example in FIG. 2, and the camera 23 is added. An image of the customer 3 viewing the menu media 51 in the movement path 2*b*2 outside the store 2 is captured by the camera 23. The camera 23 can communicate with the information processing apparatus 30. The controller 301 of the information processing apparatus 30 specifies that the customer 3 has viewed the menu media 51 from the captured image from the camera 23, by using the function of the menu specifying unit 301*a*.

The gaze status association information in FIG. 6 is configured with respect to the menu media 51. The controller 101 updates the detection item corresponding to each menu medium 51 of the gaze status association information while the customer 3 is in the movement path 2*b*2. The update process of the items corresponding to the menu media 51 is the same as that in FIG. 8.

Effects of Embodiment 2

In Embodiment 2 as well, effects similar to those in Embodiment 1 are exhibited.

In Embodiment 2, from the captured image of the customer 3 referring to the menu media 51 outside the store 2, the menu medium 51 in which the customer 3 has shown interest can be specified.

In Embodiment 2 as well, similar to Embodiment 1, the menu media 40 and the camera 21 may be further disposed in the store 2, and the gaze status association information may be further configured with respect to these menu media 40. In this case, when the menu media 40 in the store 2 and the menu media 51 outside the store 2 correspond to the same commodities, these menu media 40, 51 may be associated with each other. Then, when the menu medium in which the customer 3 has shown interest is to be specified, “time” and “the number of times” corresponding to the menu media 40, 51 associated with each other may be totaled, and the totaled value may be used in specifying the menu medium in which the customer 3 has shown interest. When information on the menu media 40, 51 associated with each other is to be transmitted from the information processing apparatus 30 to the ticket vending machine 10, information on either one of the menu media may be transmitted.

Embodiment 3

Figure 17:
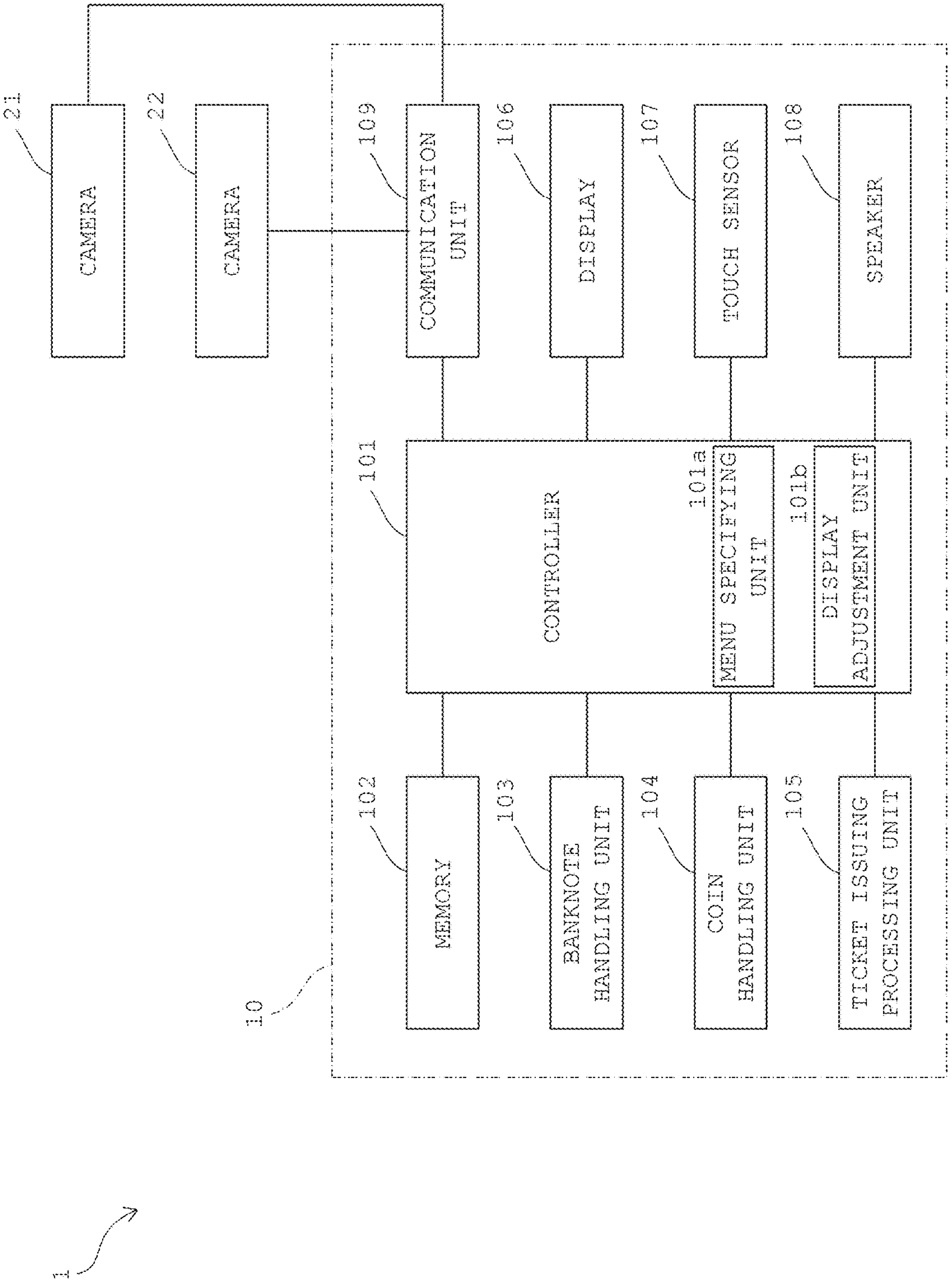
FIG. 17 is a block diagram showing a configuration of the commodity order system according to Embodiment 3.

FIG. 17 is a block diagram showing a configuration of the commodity order system 1 according to Embodiment 3.

In Embodiment 3, the information processing apparatus 30 is omitted and the functions of the menu specifying unit and the display adjustment unit are included as the function of the controller 101 of the ticket vending machine 10. The camera 21 is connected to the communication unit 109 of the ticket vending machine 10.

The function of a menu specifying unit 101*a* provided to the controller 101 is approximately the same as the function of the menu specifying unit 301*a* in Embodiment 1 above. However, the menu specifying unit 101*a* does not perform the process in step S107 in the flowchart in FIG. 8, and instead, causes the memory 102 to store the set of the specified menu medium 40 and the face information. In step S202 in FIG. 9, the controller 101 collates the face information of the above set stored in the memory 102 with the face information acquired from the captured image from the camera 22. The other processes in FIG. 9 are the same as those described above.

In the configuration in Embodiment 3, the function of a display adjustment unit 101*b* provided to the controller 101 corresponds to the function according to the flowchart in FIG. 9. That is, in Embodiment 1 above, the display adjustment unit 301*b* executes indirect control (transmission of information in step S107 in FIG. 8) for allowing the controller 101 on the ticket vending machine 10 side to perform adjustment of the display screen (commodity selection screen). In contrast, in Embodiment 3, the display adjustment unit 101*b* on the ticket vending machine 10 side directly executes the adjustment process of the display screen (commodity selection screen) in FIG. 8, in accordance with specifying of the menu medium 40 performed by the menu specifying unit 101*a*.

In Embodiment 3, the information processing apparatus of the present invention is configured by the controller 101, the memory 102, and the communication unit 109. That is, in Embodiment 3, the information processing apparatus of the present invention is built in the ticket vending machine 10.

Effects of Embodiment 3

In Embodiment 3 as well, effects similar to those in Embodiment 1 are exhibited.

In the commodity order system 1 in FIG. 17, the menu specifying unit 101*a* acquires the face information (first face information) of the customer 3 from the captured image from the camera 21 and associates the acquired first face information with the menu medium 40 in which the customer 3 has shown interest, and the display adjustment unit 101*b* acquires the face information (second face information) from the captured image of the customer 3 in the vicinity of the facing position P1 and acquires the menu medium 40 associated with the first face information that is consistent with the acquired second face information.

With this configuration, without use of means for tracking the customer who moves from the movement path 2*b*1 toward the facing position P1, the menu medium 40 in which the customer 3 has shown interest can be smoothly specified.

In Embodiment 3 as well, changes similar to those in Embodiment 2 can be made.

Modification

In Embodiment 1 above, one commodity is included in one menu medium 40. However, a plurality of commodities of the same type may be included one menu medium 40. In this case, the buttons 85 and the illustrative images 86 for respectively selecting a plurality of commodities corresponding to the menu medium 40 in which the customer 3 has shown interest may be included in the selection screen 80 in FIG. 12 to FIG. 14, or the buttons 82 of this type may be effectively displayed as compared with the other buttons 82.

In Embodiment 1 above, the menu medium 40 in which the customer has shown interest is specified according to the number of times and the time for which the customer 3 has viewed the menu medium 40. However, this specifying may be performed according to another evaluation element. For example, for each viewing of a menu medium 40 by the customer 3, the time from the beginning of the viewing to the end of the viewing may be acquired, the acquired time may be associated with the viewed menu medium 40, and the menu medium 40 corresponding to the viewing having the longest time may be specified as the menu medium 40 in which the customer 3 has shown interest. Alternatively, the menu medium 40 viewed by the customer 3 in the vicinity of the end of the movement path 2*b*1, or the menu medium 40 last viewed by the customer 3 in the movement path 2*b*1 may be specified as the menu medium 40 in which the customer 3 has shown interest.

In Embodiment 1 above, the face information of the customer 3 and the number of times and the time for which the customer 3 has viewed each of the menu media 40 are associated with each other. However, the face information of the customer 3 need not necessarily be associated. For example, in the case of the layout in FIG. 2, usually, when the customer 3 has passed through the imaging field of view of the camera 21 rearward, the customer 3 advances to the facing position P1. Therefore, in this layout, at the timing when the customer 3 has passed through the imaging field of view of the camera 21 rearward, information on the menu medium 40 in which the customer 3 has shown interest may be transmitted to the ticket vending machine 10, and the ticket vending machine 10 may cause the operation/display unit 11 to display a commodity corresponding to the menu medium 40 as a selection candidate in a prioritized manner. Accordingly, when the customer 3 has reached the facing position P1, the commodity in which the customer 3 has shown interest can be displayed in a prioritized manner as a selection candidate. In this case, the camera 22 may be omitted.

In Embodiment 1 above, collation of the face information is performed in the ticket vending machine 10. However, collation of the face information may be performed in the information processing apparatus 30. In this case, the camera 22 is connected to the information processing apparatus 30. The information processing apparatus 30 causes the memory 302 to store the combination of the menu medium 40 in which the customer 3 has shown interest and the face information.

At the timing when the customer 3 has reached the vicinity of the facing position P1, the information processing apparatus 30 receives a notification indicating this from the ticket vending machine 10. In accordance with this, the information processing apparatus 30 acquires the face information of the customer 3 facing the operation/display unit 11 from the captured image from the camera 22, and collates the acquired face information with the face information in the above combination stored in the memory 302. When there is a face image that is consistent with the acquired face image, the information processing apparatus 30 transmits information on the menu medium 40 combined with this face image, to the ticket vending machine 10. When there is no such face image, the information processing apparatus 30 transmits information indicating that there is no face image that is consistent with the acquired face image, to the ticket vending machine 10.

Upon receiving these pieces of information, the ticket vending machine 10 executes the processes in step S203 and thereafter in FIG. 9. When the information on the menu medium 40 has been received from the information processing apparatus 30, the determination in step S203 becomes YES, and when information indicating that there is no face image that is consistent has been received, the determination in step S203 becomes NO. The processes in step S203 and thereafter are the same as those described above.

In Embodiment 1 above, in step S107 in FIG. 8, information on the menu medium 40 in which the customer 3 has shown interest is transmitted. However, information on a commodity corresponding to the menu medium 40 may be transmitted. In this case, the commodity association information in FIG. 7A is stored in the memory 302 of the information processing apparatus 30.

In Embodiment 1 above, the functions of the menu specifying unit and the display adjustment unit are included in the information processing apparatus 30, and in Embodiment 3 above, these functions are included in the ticket vending machine 10. However, these functions may be included in any of the apparatuses forming the commodity order system 1, or may be provided so as to be distributed in a plurality of apparatuses. For example, when the commodity order system 1 includes the ticket vending machine 10, the information processing apparatus 30, and another information processing apparatus, the functions of the menu specifying unit and the display adjustment unit may be included in this information processing apparatus. In this case, the camera 21 is connected to the other information processing apparatus.

In Embodiments 1 to 3 above, the ticket vending machine 10 is a commodity order apparatus. However, an apparatus other than the ticket vending machine 10 may be the commodity order apparatus. For example, an apparatus that does not perform ticket issuing and that executes a function of displaying a selection candidate for a commodity and receiving an order may be the commodity order apparatus, or merely, an apparatus having only a function of displaying a selection candidate for a commodity may be the commodity order apparatus. In these cases as well, similar to the above embodiments, a commodity corresponding to the menu medium in which the customer 3 has shown interest may be displayed as a selection candidate in a prioritized manner.

The form in which a commodity corresponding to the menu medium 40 in which the customer 3 has shown interest is displayed as a selection candidate in a prioritized manner is not limited to the forms in FIG. 12 to FIG. 14 shown in Embodiment 1 above.

For example, in the selection screen 90 in FIG. 11, the button 93 for the commodity corresponding to the menu medium 40 in which the customer 3 has shown interest may be displayed in a highlighted manner with an enlarged size, a color, or the like, as compared with the other buttons 93. Audio that announces a recommended commodity may be further outputted. Without display of the button 85 for the commodity corresponding to the menu medium 40 in which the customer 3 has shown interest and the illustrative image 86 thereof, the button 82 (type selection item) of the commodity type including the commodity may be effectively displayed as compared with the other buttons 82 (type selection items).

Similarly, the method in which the type selection item of the commodity type including the commodity corresponding to the menu medium 40 in which the customer 3 has shown interest is effectively displayed as compared with the other type selection items is not limited to the method in FIG. 13, either. For example, the illustrative image 83 may be omitted and the button 82 may be displayed in a highlighted manner with an enlarged size or a color. In the selection screen 80 in FIG. 14 as well, the illustrative image 83 may be omitted and the button 82 may be highlighted with an enlarged size or a color.

In the selection screen 80 in FIG. 14, the group condition with respect to the commodity in which the customer 3 has shown interest is having a relationship of main dish/side dish. However, this group condition is not limited thereto. For example, this group condition may be having a relationship of food/beverage, or this group condition may be satisfaction of another relationship.

The configuration of the association information in which the customer 3 and the menu medium 40 in which the customer 3 has shown interest are associated with each other is not limited to the configuration shown in FIG. 6. As described above, the face information may be omitted from the association information, and the customer 3 may be managed by the serial number. The detection item may be either one of the number of times and the time, and another evaluation parameter may be used. The association information may have a configuration in which the customer 3 and only the menu medium 40 in which the customer 3 has shown interest are associated with each other.

In Embodiments 1, 3 above, the menu media 51 outside the store 2 are commodity samples. However, the menu media 51 outside the store 2 may be other menu media such as posters disposed on the outer wall of the store 2.

The layout in the store 2, the commodities handled by the store 2, and the classification of the commodities are not limited to those described in the above embodiments, either.

In addition to the above, the embodiments of the present invention can be modified as appropriate within the scope of the claims.

What is claimed is:

1. An information processing apparatus to be used in a store in which a plurality of kinds of menu media are disposed so as to be able to be viewed by a customer in a movement path of the customer up to a facing position where the customer faces a display configured to display a selection candidate for a commodity, the information processing apparatus comprising:

a controller; wherein the controller executes a first process for specifying the menu medium in which the customer has shown interest, from a captured image of the customer in the movement path; and a second process for causing the display to display, at least at an arrival timing when the customer has arrived at the facing position, a display screen such that a commodity related to the menu medium specified by the first process with respect to the customer is prioritized as the selection candidate.

2. The information processing apparatus according to claim 1, wherein the controller, in the first process, acquires at least one of the number of times and a cumulative time for which the customer has viewed each of the menu media in the movement path, and specifies the menu medium in which the customer has shown interest, based on at least one of the number of times and the cumulative time.

3. The information processing apparatus according to claim 1, wherein the controller, in the first process, estimates a direction in which the customer views, from the captured image, performs determination as to whether or not the menu media are present in the direction, and specifies the menu medium in which the customer has shown interest, based on a result of the determination.

4. The information processing apparatus according to claim 1, wherein the controller, in the first process, generates association information in which the customer and the menu medium in which the customer has shown interest are associated with each other, and based on the association information, the controller, in the second process, executes the process for causing the display to display the display screen such that the commodity related to the menu medium in which the customer has shown interest is prioritized as the selection candidate.

5. The information processing apparatus according to claim 4, wherein the controller, in the first process, acquires face information of the customer from the captured image, and associates the menu medium in which the customer has shown interest with the face information having been acquired.

6. The information processing apparatus according to claim 1, wherein the menu media are disposed in the store, and the controller, in the first process, specifies the menu medium in which the customer has shown interest, from a captured image of the customer in the movement path in the store.

7. The information processing apparatus according to claim 1, wherein the menu media are disposed outside the store, and the controller, in the first process, specifies the menu medium in which the customer has shown interest, from a captured image of the customer in the movement path outside the store.

8. A commodity order system to be used in a store in which a plurality of kinds of menu media are disposed so as to be able to be viewed by a customer in a movement path of the customer up to a facing position where the customer faces a commodity order apparatus configured to display a selection candidate for a commodity, the commodity order system being configured to receive an order of a commodity by using the commodity order apparatus, the commodity order system comprising:

a controller, wherein the controller executes a first process for specifying the menu medium in which the customer has shown interest, from a captured image of the customer in the movement path; and a second process for causing a display of the commodity order apparatus to display, at least at an arrival timing when the customer has arrived at the facing position, a display screen such that a commodity related to the menu medium specified by the first process with respect to the customer is prioritized as the selection candidate.

9. The commodity order system according to claim 8, wherein the controller, in the first process, acquires first face information of the customer from the captured image, and associates the menu medium in which the customer has shown interest with the first face information having been acquired, and the controller, in the second process, acquires second face information from a captured image of the customer in a vicinity of the facing position, and acquires the menu medium associated with the first face information that is consistent with the second face information having been acquired.

10. The commodity order system according to claim 8, wherein a commodity selection screen that is displayed on the display is composed of a plurality of layers, and the commodity order apparatus causes a selection item for the commodity corresponding to the menu medium specified by the first process to be included in a selection screen in an initial state that is displayed on the display.

11. The commodity order system according to claim 10, wherein the selection screen in the initial state includes a plurality of type selection items each for selecting a commodity type, and the commodity order apparatus causes the type selection item, among the plurality of type selection items displayed on the selection screen in the initial state, of a commodity type including the commodity corresponding to the menu medium specified by the first process, to be effectively displayed as compared with another of the type selection items.

12. The commodity order system according to claim 10, wherein the selection screen in the initial state includes a plurality of type selection items each for selecting a commodity type, and the commodity order apparatus causes the type selection item, among the plurality of type selection items displayed on the selection screen in the initial state, of a commodity type that satisfies a predetermined group condition with respect to the commodity corresponding to the menu medium specified by the first process, to be effectively displayed as compared with another of the type selection items.

13. A control method for an information processing apparatus to be used in a store in which a plurality of kinds of menu media are disposed so as to be able to be viewed by a customer in a movement path of the customer up to a facing position where the customer faces a display configured to display a selection candidate for a commodity, the control method comprising:

specifying the menu medium in which the customer has shown interest, from a captured image of the customer in the movement path; and executing a process for causing the display to display, at least at an arrival timing when the customer has arrived at the facing position, a display screen such that a commodity related to the menu medium specified with respect to the customer is prioritized as the selection candidate.

14. A non-transitory tangible storage medium storing a program for causing an information processing apparatus to execute a predetermined function, the information processing apparatus being configured to be used in a store in which a plurality of kinds of menu media are disposed so as to be able to be viewed by a customer in a movement path of the customer up to a facing position where the customer faces a display configured to display a selection candidate for a commodity, the program including:

a function for specifying the menu medium in which the customer has shown interest, from a captured image of the customer in the movement path; and a function for causing the display to display, at least at an arrival timing when the customer has arrived at the facing position, a display screen such that a commodity related to the menu medium specified with respect to the customer is prioritized as the selection candidate.

* * * * *